United States Patent [19]

Haley et al.

[11] 3,829,669

[45] Aug. 13, 1974

[54] D.C. ANALOG CALCULATOR FOR RAPIDLY GENERATING ELECTRIC POWER SYSTEM LOADFLOW SOLUTIONS

[75] Inventors: Paul H. Haley, Pittsburgh, Pa.; Mark K. Enns, Ann Arbor, Mich.

[73] Assignee: Westinghouse Electric Corporation, Pittsburgh, Pa.

[22] Filed: May 19, 1972

[21] Appl. No.: 255,111

[52] U.S. Cl................ 235/151.21, 444/1, 235/184, 307/52, 340/172.5
[51] Int. Cl............................................. G06g 7/62
[58] Field of Search............ 235/151.21, 150.5, 150, 235/151.1, 184; 307/18, 19, 20, 24, 30, 31, 52, 62; 444/1; 340/172.5

[56] References Cited
UNITED STATES PATENTS

| | | | |
|---|---|---|---|
| 3,341,697 | 9/1967 | Kaufman et al. ............ | 235/150.5 X |
| 3,582,628 | 6/1971 | Brussolo .......................... | 235/150.5 |
| 3,675,002 | 7/1972 | Mitsui et al..................... | 235/184 X |
| 3,699,538 | 10/1972 | VanEssen ........................ | 340/172.5 |
| 3,701,891 | 10/1972 | Cohn .............................. | 235/184 X |

OTHER PUBLICATIONS

Load Flows By Hybrid Computation For Power System Operations; M. Enns, T. C. Giras & N. R. Carlson; IEEE Transactions on Power Apparatus and Systems, Nov./Dec. 1971, pp.2540–2547.

Techniques For The Real-Time Monitoring Of Power System Operations; G. W. Stagg, J. F. Dopazo, 0. A. Klitin & L. S. Vanslyck; IEEE Transactions on Power Apparatus and Systems; Vol. PAS—89, No. 4, April 1970, pp. 545–555.

Load Flows Using A Combination Of Point Jacobi And Newton's Methods; Y. P. Dusonchet, S. N. Talukdar, H. E. Sinnot; IEEE Transactions on Power Apparatus and Systems; Vol. PAS—90, No. 3, May/June 1971, pp. 941–949.

Computer Control of Power Systems; The Engineer, Oct. 2, 1964.

Primary Examiner—Malcolm A. Morrison
Assistant Examiner—Edward J. Wise
Attorney, Agent, or Firm—E. F. Possessky

[57] ABSTRACT

An analog loadflow calculator includes a modularized analog network simulator which includes modular circuits representative of power system buses, lines, generators and loads and interconnected to simulate the power system. The modular generator circuits, load circuits and line circuits provide currents to be summed at appropriate bus circuits. The simulator operates to force observance of current and voltage laws and to provide the bus voltage solution.

6 Claims, 41 Drawing Figures

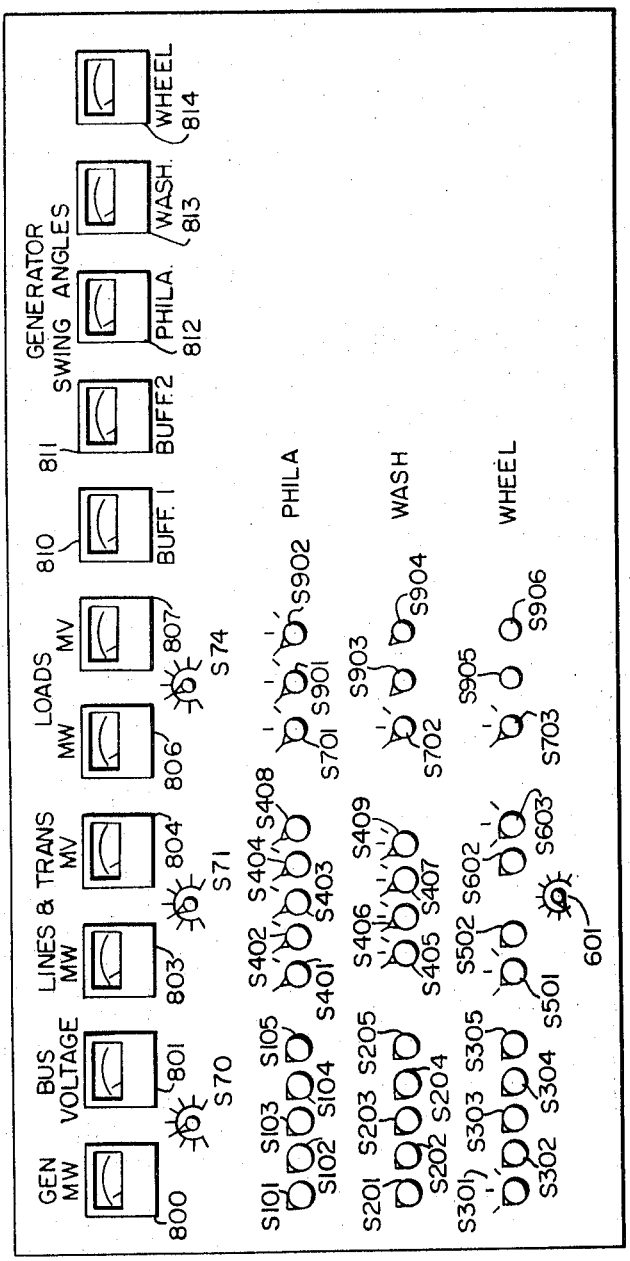
FIG. 22
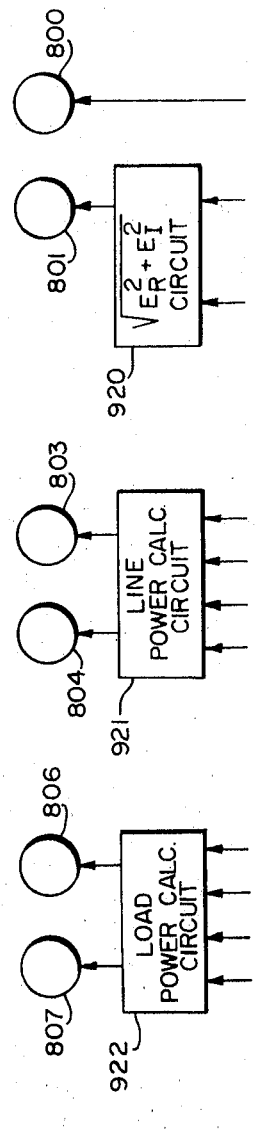
FIG. 23C
FIG. 23B
FIG. 23A

D.C. ANALOG CALCULATOR FOR RAPIDLY GENERATING ELECTRIC POWER SYSTEM LOADFLOW SOLUTIONS

CROSS-REFERENCE TO RELATED APPLICATIONS

1. Ser. No. 255,111 entitled "DC Analog Calculator For Rapidly Generating Electric Power System Loadflow Solutions" and filed by P. H. Haley and M. K. Enns on May 19, 1972.

2. Ser. No. 255,246 entitled "Modules For Simulation Of An Electric Power System In A Loadflow Computer Arrangement" and filed by P. H. Haley and M. K. Enns on May 19, 1972.

3. Ser. No. 255,049 entitled "Hybrid Computer Systems Including An Analog Calculator For Rapidly Generating Electric Power System Loadflow Solutions" and filed by P. H. Haley and M. K. Enns on May 19, 1972.

4. Ser. No. 255,048 entitled "DC Modules For Simulating Electric Power Systems For Loadflow and Transient Stability Studies" and filed by N. R. Carlson and W. E. Zitelli on May 19, 1972.

5. Ser. No. 255,110 entitled "Hybrid Computer System For Rapid Generation Of Electric Power System Loadflow Solutions And Transient Stability Analysis" and filed by N. R. Carlson and W. E. Zitelli on May 19, 1972.

6. Ser. No. 254,957 entitled "Desk Console Power Systems Simulator With Hands-On Control" and filed by N. R. Carlson, V. Burtnyk and W. E. Zitelli on May 19, 1972.

7. Ser. No. 255,167 entitled "Computation Of Power System Loadflows And Transient Stability" and filed by N. R. Carlson, V. Burtnyk and W. E. Zitelli on May 19, 1972.

8. Ser. No. 254,858 entitled "On-Line Hybrid Computer Arrangement Having Universal Interfacing Capability For Electric Power System Studies" and filed by N. R. Carlson and U. G. Ronnen on May 19, 1972.

9. Ser. No. 255,050 entitled "System And Method For Converging Iterations For Loadflow Solution In A Hybrid Loadflow Computer Arrangement With Transient Stability Analysis Capability" and filed by N. R. Carlson and M. K. Enns on May 19, 1972.

10. Ser. No. 254,859 entitled "System And Method For Monitoring Transient Stability In a Hybrid Loadflow Computer Arrangement Having Transient Stability Analysis Capability" and filed by N. R. Carlson and M. K. Enns on May 19, 1972.

BACKGROUND OF THE INVENTION

The present invention relates to electric power systems and more particularly to hybrid computer systems and analog systems which are operated to provide both loadflow solutions and transient stability analysis.

Power system studies generally have been performed on special purpose analog computers known as AC network calculators or network analyzers particularly throughout the time period from 1929 to about 1955. The analyzers modeled actual power systems directly with the employment of lumped resistance and inductance for transmission lines and small transformers with rotatable cores for synchronous generators. With the additional employment of symmetrical component transformation, special purpose circuits for induction motors, step-by-step slide rule calculations and other means, loadflow studies, transient stability studies, and other power system studies were successfully carried out. DC network analyzers have been employed, but they were limited to real power loadflow studies.

One significant limitation in the utility of network analyzers was that the size of the power system which could be represented was limited by the amount of equipment in any particular network analyzer installation. Historically, only a few developed network analyzers were large enough to handle large power systems, and even the largest network analyzers were limited to about 40 generation units and 400 transmission lines. Electric power companies without their own network analyzers had to schedule the use of an available network analyzer 1 to 2 years in advance and then set up and study all of the study cases needed for the following year in a calculation use period of 1 or 2 weeks. Any errors made in the study cases could only be corrected during the next scheduled usage of the network analyzer. Data handling, analyzer set up, reading and recording functions were generally performed manually.

By about 1955 general purpose digital computers had become available to electrical apparatus manufacturers and at least some of the larger electric power companies. Accordingly, methods and algorithms were soon developed for software solution and/or analysis of power system study cases. By 1960, many digital computer programs had been developed to solve or analyze various power system study cases and such cases could be run more accurately and at lower cost with the digital computers as compared to the analog network analyzers. Many additional digital computer program developments have occurred since 1960.

With the recent awareness of the possibilities of power system "blackouts" and "brownouts," increasing emphasis has developed for the improvement of power system reliability and security with particular regard to overloads at steady state. Power system security is provided in the first instance by provision of adequate generation and transmission capacity for expected system loads. Additional security measures include a tying of power companies into power pools to strengthen the transmission network, the adoption of emergency load shedding porcedures, and automatic control of power systems by on-line digital control computers. Security considerations have further increasingly made it desirable to provide for on-line power system studies so that consequences of system changes or trends can be rapidly evaluated to provide system security. Although the programmed digital computer generally perform satisfactorily in making off-line power system studies, on-line implementation of software power system studies often are either infeasible or if feasible subject to various disadvantages such as limited solution speed.

Generally, digital loadflow and transient stability programs have been refined through the years to provide faster solution speeds due to the use of more efficient algorithms, such as the Newton Raphson method, coupled with the high speed of available digital computers. Such digital programs have been commonly used for system planning functions and are usually highly flexible for adaption to a variety of network configurations. Further, the digital programs allow sophisticated representation of various special functions including phase shifting transformers, remote voltage controlled buses and tie line controls. In any case, the speed of digital loadflow and transient stability programs has been a deterrent to on-line implementation. In contrast, the possibilities for use of hybrid computer arrangements of all analog arrangements for on-line applications are made evident by the fact that the on-line applications usually require a relatively faster solution and can tolerate less accuracy, less network reconfiguring capability and less representational capability for special functions. Further, with respect to off-line studies, a hybrid arrangement or an all analog arrangement gives rise to immediately observable results in real time or faster than real time.

Previously filed related applications including Ser. No. 175,287, entitled "Hybrid Computer System And Method For Rapidly Generating Electric Power System Loadflow Solutions" and filed by D. M. Egelston and M. K. Enns in Aug. 26, 1971; Ser. No. 175,286, entitled "Hybrid Computer System And Method For Rapidly Generating Electric Power System Loadflow Solutions" and filed by D. M. Egelston, M. K. Enns and J. C. Russell on Aug. 26, 1971; Ser. No. 175,292, entitled "Security Monitoring System And Method For An Electric Power System Employing A Fast On-Line Loadflow Computer Arrangement" and filed by D. M. Egelston and J. C. Russell on Aug. 26, 1971; Ser. No. 175,293, entitled "Loadflow Computer And D.C. Circuit Modules Employed Therein For Simulating A.C. Electric Power Networks" and filed by M. K. Enns and P. H. Haley on Aug. 26, 1971; Ser. No. 175,289, entitled "System And Method For Converging Iterations In A Hybrid Loadflow Computer Arrangement" and filed by M. K. Enns, J. E. Petit and J. C. Russell on Aug. 26, 1971; Ser. No. 175,290, entitled "Hybrid Interfacing Of Computational Functions In A Hybrid Loadflow Computer Arrangement For Electric Power Systems" and filed by J. C. Russel on Aug. 26, 1971; and Ser. No. 175,291, entitled "Application Of Basecase Results To Initiate Iterations And Test For Convergence In A Hybrid Computer Arrangement Used To Generate Rapid Electric Power System Loadflow Solutions" and filed by J. E. Petit, M. K. Enns and N. R. Carlson on Aug. 26, 1971, all of the above assigned to the present assignee, generally provide for hybrid arrangements employing an analog simulator including modules representative of system buses and lines for generation of loadflow solutions. Also provided for were convergence and monitoring of loadflow solutions attained by these arrangements. Accordingly, these hybrid arrangements provide speed and computational improvements over the prior art just considered.

Further speed and computational improvements are achieved by representing most or all of the actual power system components through analog simulation. Additionally, all analog simulation can be supplemented by hardware or software for the performance of transient stability analysis computations in real time or faster than real time.

The disclosures in this application and some of the aforenoted cross-reference applications provide further improvements and variously pertain to hardware and software structure of hybrid and all analog computer arrangements relating to both loadflow and transient stability studies. No representation is made that any prior art considered herein is the best pertaining prior art not that the considered prior art cannot be interpreted differently from the interpretations placed on it herein.

SUMMARY OF THE INVENTION

Rapid power system load flow solutions are provided on the basis of system data by a DC analog simulator including modular bus, generator, load and line circuits for representing an actual power system. The bus circuits respond to generator, load and line current inputs and produce bus voltage outputs. The generator and load circuits respond to predetermined power constraints and respectively produce generator and load current outputs to associated bus circuits. The line circuits respond to applied bus voltage inputs from bus circuits to which they connect and produce line current outputs to associated buses in accordance with at least the equivalent series branch impedance.

BRIEF DESCRIPTION OF THE DRAWINGS

FIG. 23A shows a load power calculating circuit employed in connection with the control panel of FIG. 22.

FIG. 23B shows a line power calculating circuit employed in connection with the control panel of FIG. 22.

FIG. 23C shows a generator electrical power and terminal voltage magnitude calculating circuit employed in connection with the control panel of FIG. 22.

LOADFLOW CALCULATOR FOR AN ELECTRIC POWER SYSTEM

Figure 1:
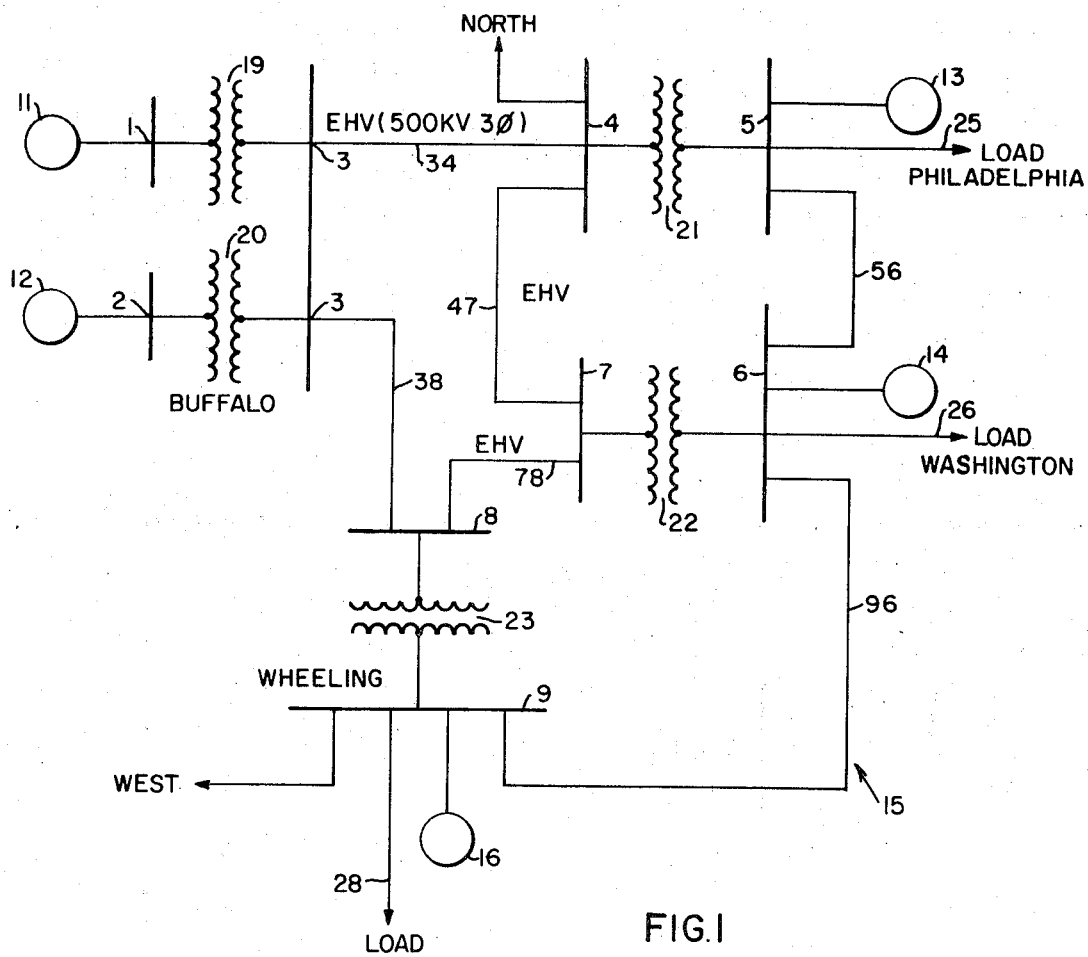
FIG. 1 shows a schematic diagram of an illustrative power system for which loadflow solutions and transient stability analysis and security monitoring are to be provided.

Shown in FIG. 1 is a fictional electric power system 15 in schematic form incorporated herein for purposes of illustrating a power system to which the invention may be applied.

As will be seen from viewing FIG. 1 there is shown an EHV 500-KV loop with a generating plant consisting of two generating units 11 and 12 of the 500-MW class at the station indicated as "Buffalo" and bulk power supply stations at "Philadelphia," "Washington" and "Wheeling." At the latter three stations there are auto-transformers 21, 22 and 23 stepping down to 230-KV and connecting into a 230-KV system. The three generators 13, 14 and 16 at Philadelphia, Washington, ahd Wheeling respectively, represent equivalents of the 230-KV power system at these stations. The system also includes a 500-KV interconnection or tie line to the north as indicated by "NORTH" and a 230-KV interconnection or tie line to the west as indicated by "WEST."

Actual buses of the power system 15 are points where connections are made. It will be seen from a view of FIG. 1 that there are nine (9) buses in the illustrative electric power system 15. Buses 1 and 2 are connected to the generation units 11 and 12, as well as transformers 19 and 20 respectively at the buffalo station. Bus 3 at the Buffalo station connects to buses 1 and 2 through transformers 19 and 20 respectively, as well as to the EHV loop via transmission lines 34 and 38. The Buffalo station may be considered to be akin to a "mine mouth" station, i.e., a station whose generation plant is at a mine mouth, and therefore no real local load is experienced there.

Bus 4 at the Philadelphia station connects to the EHV loop via transmission lines 34 and 47, to the 500-KV interconnection or tie line NORTH and to bus 5 through transformer 21. Bus 5 at the Philadelphia station connects to bus 4 through transformer 21, to generator 13, to the 230-KV loop via transmission line 56 and to a load 25.

At the Washington station, bus 6 connects to the 230-KV loop via transmission lines 56 and 96, to generator 14, a load 26 and to bus 7 through transformer 22. Bus 7 at the Washington station connects to bus 6 through transformer 22 and to the EHV loop via transmission lines 47 and 78.

Bus 8 at the Wheeling station connects to the EHV loop via transmission lines 38 and 78 and to bus 9 through transformer 23. Finally, bus 9 at the Wheeling station connects to bus 8 through transformer 23, to the 230-KV loop via transmission line 96, to generator 16, to a load 28 and to the 230-KV interconnection or tie line WEST.

HYBRID LOADFLOW COMPUTER ARRANGEMENT

Figure 2:
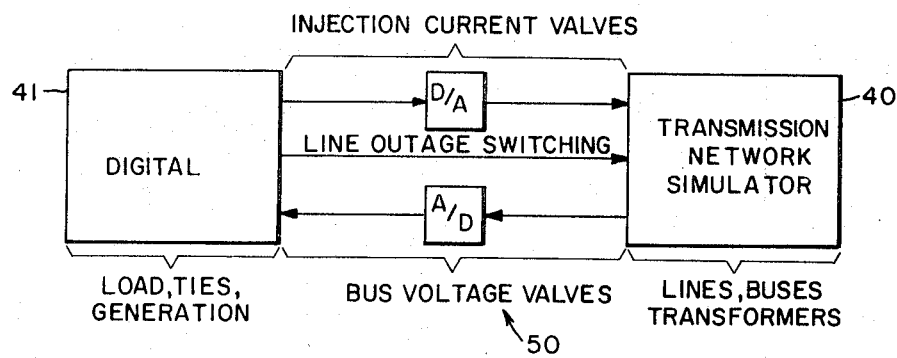
FIG. 2 shows a block diagram of a hybrid loadflow computer arrangement wherein system load, tie line and generation effects are represented in the digital computer.

Shown in FIG. 2 is a hybrid loadflow computer arrangement 50 which provides a framework for certain improvements considered more fully subsequently herein and which otherwise is generally similar to an arrangement disclosed in the aforementioned copending application Ser. No. 175,286 entitled "A Hybrid Computer System And Method For Rapidly Generating Electric Power System Loadflow Solutions." There and in aforementioned copending application Ser. No. 175,293 is disclosed an analog transmission network simulator similar to that included in the hybrid arrangement in FIG. 2 and having reference numeral 40. The network simulator 40 is interfaced with a digital computer system 41 through digital-analog and analog-digital conversion subsystems as well as line outage switching circuitry. The digital computer 41 performs both data acquisition functions and many on-line functions relating to power dispatching and power system control. Accordingly, data required to support A-C loadflow calculations including real and reactive load power, real and reactive tie line flows, and generator real power and regulated voltage magnitude are resident in computer memory for use upon request of a loadflow calculation.

For more detail on a digital computer system and a program system usable in it for the purposes described, reference is made to Ser. No. 175,286, entitled "Hybrid Computer System And Method For Rapidly Generating Electric Power System Loadflow Solutions" and filed by D. M. Egelston, M. K. Enns and J. C. Russell on Aug. 26, 1971.

In that patent application, two P250 computers are operated under program control, but a single computer or other computer conbinations can be used according to the needs of the particular implementation.

In the hybrid loadflow conputer arrangement 50, the transmission network simulator 40 models the interconnections of the transmission lines, transformers and buses included in an actual power transmission system. As indicated above, the digital computer 41 forces observance of load power and generation constraints by an iterative solution process.

The copending application Ser. No. 175,293 discloses modular analog models of actual power system buses and lines employable in the simulator 40. Transformers are modeled as transmission lines in that disclosure. These modules and their interaction are shown in schematic form in FIG. 3. A brief description of the bus and line modules will ensue for purposes of enhancement of the discussion of the inventive concepts herein.

Figure 3:
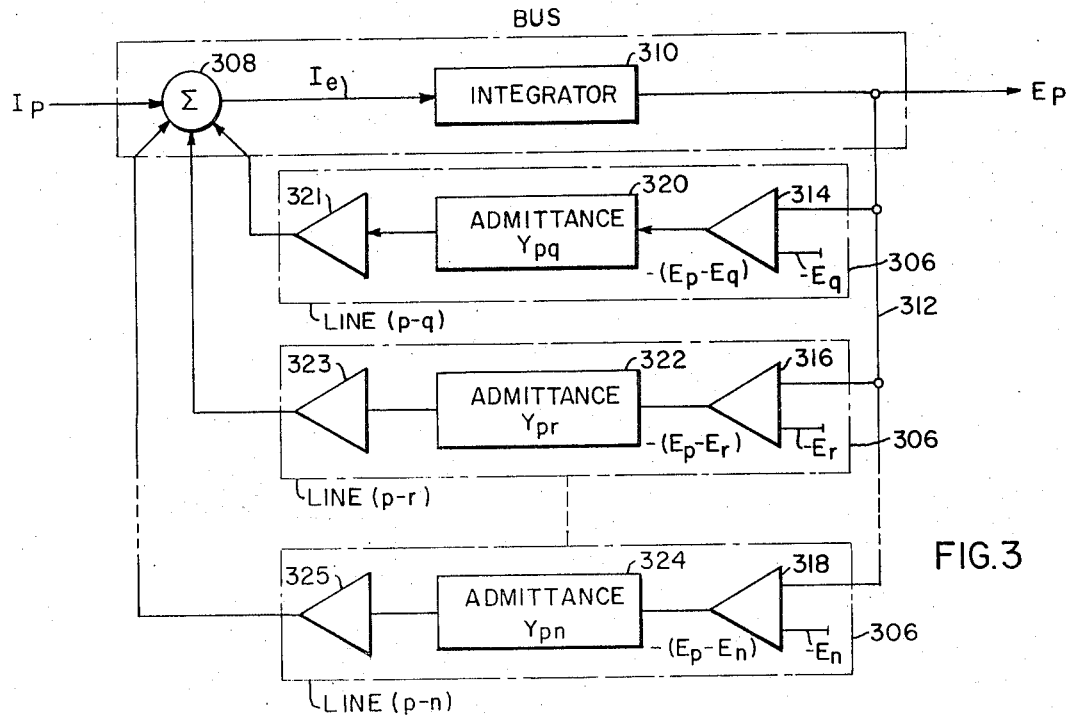
FIG. 3 shows a schematic diagram of interconnected line and bus modules usable in the transmission network simulator portion of the hybrid loadflow computer arrangement shown in FIG. 2.

Shown in FIG. 3 is a bus module $p$ which corresponds to bus $p$ and line modules $p$–$q$, $p$–$r$, and $p$–$n$ which correspond to lines from bus $p$ to buses $q$, $r$ and $n$. These modules are interconnected to provide an analog voltage solution for the bus $p$ with the application of an externally determined bus injection current $I_p$. The bus injection current $I_p$ is a current representative of net current flow into or out of the network through bus p as determined externally by the digital computer 41 of FIG. 2. The voltage $E_p$ is the bus $p$ phasor voltage for which a solution is to be reached by error current integration, and the voltage quantities $E_q$, $E_r$, and $E_n$ are bus phasor voltages obtained from bus modules $q$, $r$ and $n$ through the respectively indicated line modules $(p$–$q)$, $(p$–$r)$ and $(p$–$n)$.

In operation, the bus and line module circuits of FIG. 3 interact to force Kirchhoff's current law to be observed for the bus $p$. As a result of summing the bus injection and line currents entering or leaving the bus p, an error current $I_e$ is generated by a summer 308 and applied to an integrator 310.

The voltage output $E_p$ from the integrator 310 is applied through a connector 312 to the inputs of operational amplifiers 314, 316 and 318 in the line modules. The respective voltage differences between the bus voltage $E_p$ and the bus voltages $E_q$, $E_r$ and $E_n$ are applied to Pi section series branch admittance equivalents 320, 322 and 324. Output currents from line module amplifiers 321, 323 and 325 represent line currents which flow into or out of the bus $p$ and accordingly are summed and the sum is differenced with the injection current $I_p$ at the summer 308. Integration continues until the output voltage $E_p$ reaches a value at which no error current is generated by the summer 308.

A TRANSMISSION NETWORK SIMULATOR FOR ALL ANALOG LOADFLOW COMPUTATIONS

As mentioned previously, where the digital computer 41 of FIG. 2 was previously employed to provide, among other functions, imposition of real and reactive load power constraints, as well as generator real power and voltage magnitude constraints at the analog simulator system buses, the loadflow solution was achieved by iterating between the digital computer and the analog transmission network simulator. That is, the digital computer would calculate an initial bus injection current $I_{po}$ which would be delivered to bus module $p$ through a digital-analog converter subsystem. After summation of this initial bus injection current with the relevant line currents and integration of an initial error current $I_{eo}$, an initial bus phasor voltage at bus $p$, $E_{po}$, would be generated. This initial bus phasor voltage $E_{po}$, then would be delivered to the digital computer through an analog-digital converter subsystem to aid in the calculation of a new bus injection current, and this iterative method would be continued until the error current reduced ideally to zero, each time a new bus phasor voltage is being delivered to the digital machine. As described hereinafter an augmented transmission network simulator provides all analog loadflow computation with improved performance in certain applications in that it negates any requirement for an iterative process to reach a loadflow solution. The all analog loadflow calculation is usable with a computer in an arrangement broadly like that shown in FIG. 2 but in such application the computer functions essentially as a data supplier rather than as an operative calculating element.

By providing a transmission network simulator with generator modules and load modules as well as bus and line modules and thereby enforcing generator real power and voltage magnitude constraints, as well as load real and reactive power constraints at a bus by analog means rather than by digital computer means, the loadflow solution may be achieved almost instantaneously within the all analog simulator because no iterations are required between the digital and analog computers. In this case, the digital computer is included as a source of certain power and voltage set points for the analog loadflow calculator, of infinite bus voltages at the ends of tie lines, and for solution monitoring.

A preferred configuration of an all analog loadflow calculator as described above is shown in FIG. 4 as indicated by the reference character 39. It is preferably formed with the use of integrated circuitry and/or discrete components and it operates as an economically produced and flexibly usable model of the AC power system network of FIG. 1 through a unique combination of circuit modules representative of elements of the network. It will be appreciated from a comparison with FIG. 2 that there is included in the simulator 39 in FIG. 4 a block 45 representative of analog generation and load modules. The block 45 outputs currents to the analog bus and line module block 40a which is akin to the previously described transmission network simulator 40 in the iterative hybrid arrangement of FIG. 2. The block 45 receives, through a digital-analog converter subsystem load power and generator power and voltage magnitude set points from a digital computer 41a, which digital computer receives and monitors bus voltage and line current solutions from the bus and line block 40a. It will be appreciated that while in the instant embodiment these set points are provided digitally, they may also be provided manually through the use of potentiometers. Further, it will be noted that generator voltage and power values and load power values are those values ordinarily and customarily observed and under control for loadflow solutions. The block 40a also applies bus voltage signals to the generation and load block 45.

Figure 4:
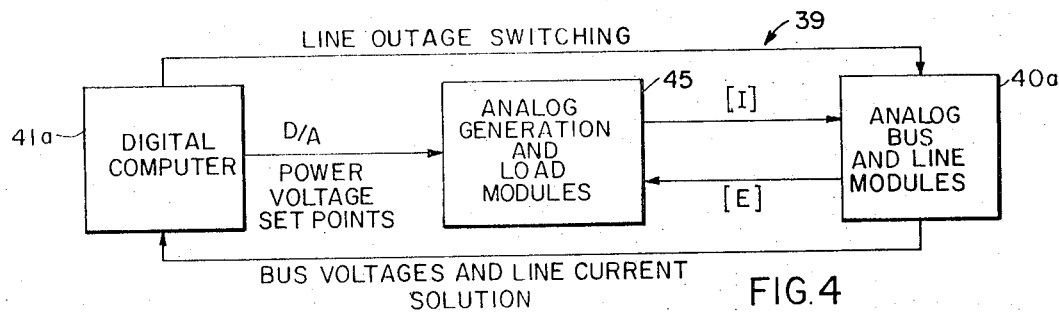
FIG. 4 shows a block diagram of a hybrid loadflow computer arrangement wherein generator and load effects are represented through analog modules.
Figure 5:
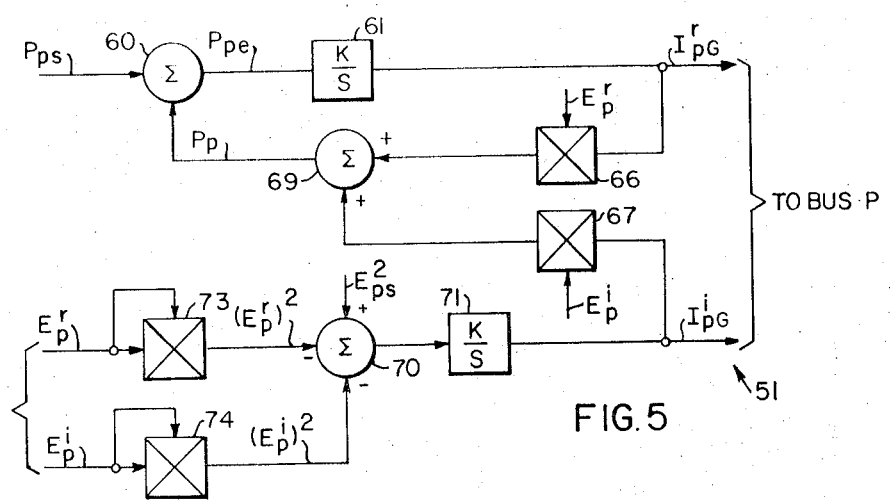
FIG. 5 sets forth a schematic diagram of a generator module used in the analog portion of the hybrid loadflow computer arrangement of FIG. 4.
Figure 6:
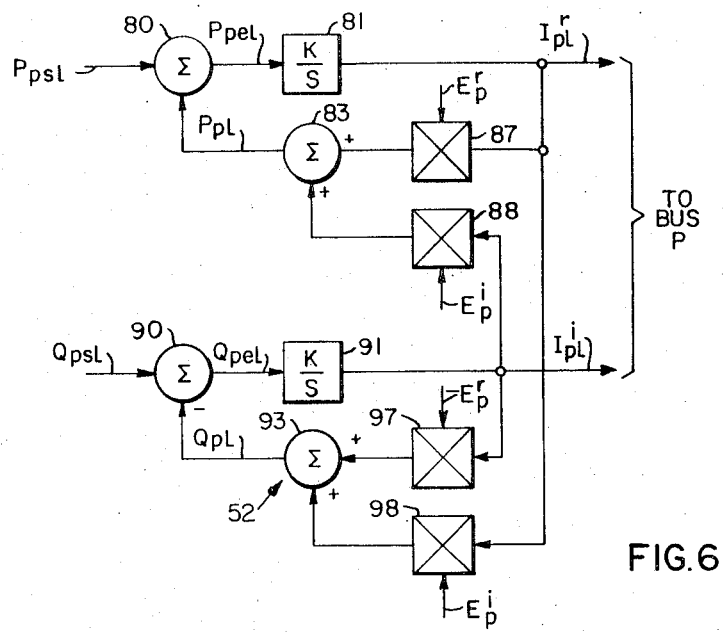
FIG. 6 sets forth a schematic diagram of a load module used in the analog portion of the hybrid loadflow computer arrangement of FIG. 4.

Attention is now drawn to FIGS. 5 and 6 which respectively show in schematic form generator and load modules 51 and 52 employed in circuit block 45 of FIG. 4. As shown in FIG. 5, set point signals enter the module 51 through the digital-analog converter subsystem from the digital computer 41a of FIG. 4 and are identified as $P_{ps}$, representative of the scheduled real power supplied to the actual bus $p$ in the actual system and $E_{ps}^2$ representative of the square of the scheduled voltage magnitude at the actual bus $p$ in the actual power system and generated by a squaring circuit, not shown, which has the digitally provided set point $E_{ps}$ as an input. The signals $E_p^r$ and $E_p^i$ are phasor inputs to the generator module from the bus $p$ module and are representative of real and imaginary components of actual bus voltage at bus $p$. The output phasor signals $I_{pG}^r$ and $I_{pG}^i$ of the generator module 51 are representative of real and imaginary components of generation current $I_p$ and as indicated in FIG. 4 are delivered to the bus $p$ module. It will be appreciated that while FIG. 3 depicts bus voltages, line currents and injection current as such in actuality real and imaginary coordinate components of these voltages and currents are generated in accordance with circuitry shown in the aforementioned copending application Ser. No. 175,293.

As will be seen from viewing FIG. 5, the phasor current $I_{pG}^4$ is generated through integration of the difference of the scheduled real power $P_{ps}$ and the actual real power to bus $p$, $P_p$. The difference signal, $P_{ps}-P_p$, or $P_{pe}$, is produced by a summation device or circuit 60 and the integration of the difference $P_{ps}-P_p$, or $P_{pe}$, is achieved through an integration device or circuit 61. The actual power signal $P_p$ is derived from the relationship $P_p = E_p^r I_{pG}^r + E_p^i I_{pG}^i$, i.e., the actual power $P_p$ is equal to the sum of the products of the real voltage component and the real current component and of the imaginary voltage component and imaginary current component respectively. This is achieved through multiplication devices or circuits 66 and 67 and summing device or circuit 69. As shown, the multiplication device 66 has as signal inputs the real component $E_p^r$ of actual voltage at the bus $p$ and the real component $I_{pG}^r$ of the generation current, $I_p$, from the generator to bus $p$, the output signal being the product of the inputs, $E_p^r I_{pG}^r$. The multiplication device 67 has as its signal inputs the imaginary component $E_p^i$ of the actual bus $p$ voltage and the imaginary component $I_{pG}^i$ of the generation current $I_{pG}$ from the generator to bus $p$, the output signal being the product of the inputs, $E_p^i I_{pG}^i$.

As will be seen, the imaginary component $I_{pG}^i$ of bus $p$ generation current $I_{pG}$ is derived through integration of the difference of the square of the voltage magnitude set point, $E_{ps}$, and the squares of real and imaginary components of the actual bus $p$ voltage, $E_p^r$ and $E_p^i$, respectively. This is done in accordance with the relationship $E_p^2 = (E_p^r)^2 + (E_p^i)^2$, i.e., the square of the magnitude of the voltage at bus $p$ equals the sum of the squares of the real and imaginary components of the voltage at bus $p$. The result of the above difference in squares of voltages is the square of an error voltage, $e_{pe}$, which is integrated to generate the phasor current $I_{pG}^i$.

As shown in FIG. 5, a summation device or circuit 70 receives signals representative of the above noted squared voltage and produces a signal representative of the aforementioend squared error. The signals representing the squares of the voltage components $E_p^r$ and $E_p^i$ are generated by multiplication devices or circuits 73 and 74, respectively as shown. Integration of the squared error voltage signal to yield a signal representing the imaginary current component $I_{pG}^i$ is achieved through integration device or circuit 71.

Reference is now made to FIG. 6 which illustrates in schematic form the above referred load module 52 employed in the loadflow calculator 39. Shown in FIG. 6 are scheduled real and reactive load power inputs $P_{psL}$ and $Q_{psL}$ respectively which originate in the digital computer 41a of FIG. 4 and are input to the load module 52 through the digital-analog converter circuitry. The outputs of the load module 52 are real and imaginary components of the current drawn by the actual load from the bus $p$, and are designated $I_{pL}^r$ and $I_{pL}^i$, respectively. More background on the scheduling of load power as well as generation power and voltage can be obtained by reference to Ser. No. 175,286.

As will be seen from viewing FIG. 6, a signal representing the real component of current drawn by the load from bus $p$, $I_{pL}^r$, is generated through the integration of a power error signal, $P_{peL}$, which is the difference of a signal representing the scheduled real load power $P_{psL}$ and a signal representing the actual load power drawn by the load from bus $p$, $P_{pL}$. The error signal $P_{peL}$ is generated through a summation device or circuit 80 which has as its inputs the above-described real power set point signal, $P_{psL}$, and the actual real load power signal, $P_{pL}$. Integration of the error signal, $P_{peL}$, is achieved by an integration device or circuit 81.

The actual real load power signal, $P_{pL}$, is derived through a summation device 83 which has as inputs respective signals representing the product of the real component of actual voltage of bus $p$, $E_p^r$, and the real component of load current, $I_{pL}^r$, as well as the product of the imaginary component of actual voltage at bus $p$ and the imaginary component of load current $I_{pL}^i$. These products are derived through multiplication devices or circuits 87 and 88, respectively. The multiplication device 87 has as inputs respective signals representing the real component of actual voltage at bus $p$, $E_p^r$ derived from the bus $p$ module, and the real component of load current, $I_{pL}^r$, while the multiplication device 88 has as inputs respective signals representing the imaginary component of actual voltage at bus $p$, $E_p^i$ derived from the bus $p$ module, and the imaginary components of load current, $I_{pL}^i$. The actual real power, $P_{pL}$, is derived in accordance with the equation $P_{pL} = E_p^r I_{pL}^r + E_p^i I_{pL}^i$.

As shown, the imaginary component of the current drawn by the load from bus $p$, or $I_{pL}^i$, is generated through the integration of a reactive power error signal, $Q_{peL}$. The reactive power error signal, $Q_{peL}$, is derived as the difference of the aforementioned scheduled reactive load power set point signal, $Q_{psL}$, and the actual reactive load power signal, $Q_{pL}$. The difference signal is achieved through a summation device or circuit 90 having input signals of the scheduled reactive load power, $Q_{psL}$, and the actual reactive load power, $Q_{pL}$. Integration of the reactive power error signal is attained by an integration device or circuit 91.

As will be seen through viewing FIG. 6, the actual reactive load power, $Q_{pL}$, is derived via the summation of the product of the negative of the real bus voltage component $-E_p^r$, and the imaginary component of the load current, $I_{pL}^i$, as well as the product of the imaginary bus voltage component $E_p{}^i$, and the real component of the load current, $I_{pL}{}^r$. Summation is achieved through summation device or circuit 93 which has as inputs, respectively, signals representing the products $-E_p{}^r I_{pL}{}^i$ and $E_p{}^i I_{pL}{}^r$. These product signals are respectively provided from multiplication devices or circuits 97 and 98. The multiplication device 97 has as inputs, respective, signals representing the negative of the real component of actual bus voltages, $-E_p{}^r$, and the imaginary component of load current, $I_{pL}{}^i$. The multiplication device or circuit 98 has as inputs, respective signals representing the imaginary component of actual bus voltage, $E_p{}^i$, and the real component of load current, $I_{pL}{}^r$. Thus, the actual reactive load power, $Q_{pL}$ is derived in accordance with the equation $Q_{pL} = -E_p{}^r I_{pL}{}^i + E_p{}^i I_{pL}{}^r$.

Figure 7:
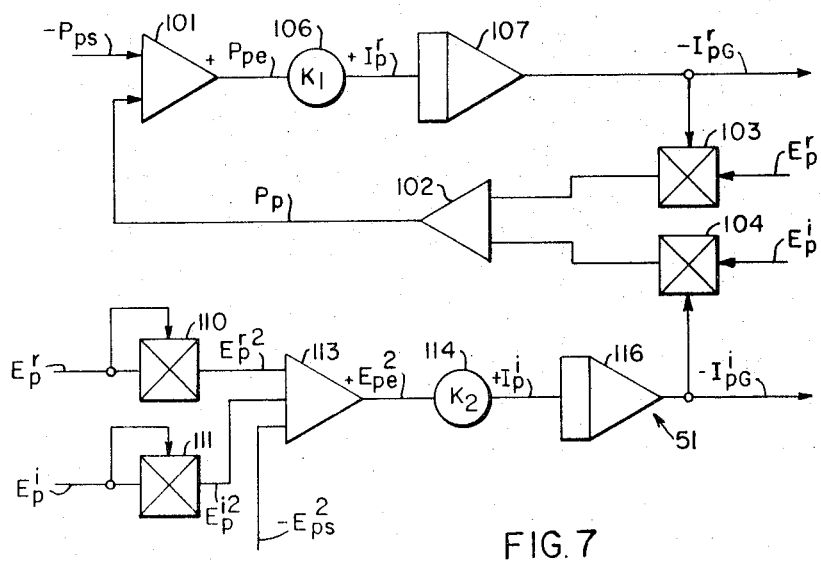
FIG. 7 shows a more detailed schematic diagram of the generator module of FIG. 5.
Figure 8:
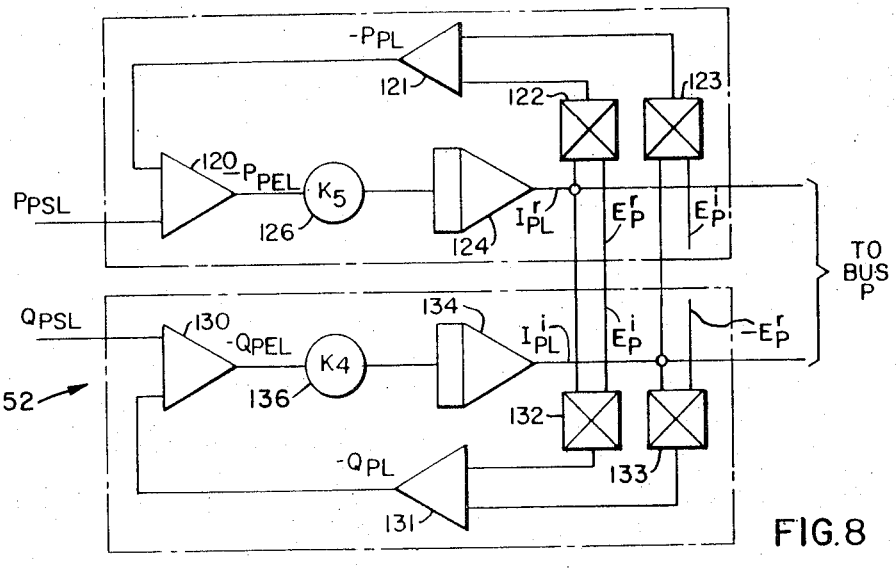
FIG. 8 shows a more detailed schematic diagram of the load module of FIG. 6.

Reference is now made to FIGS. 7 and 8 which show in greater schematic detail the preferred generation and load modules 51 and 52 of the loadflow calculator 39. As shown for the generation module in FIG. 7, the signal for the negative of scheduled real power delivered to bus $p$, $-P_{ps}$ is input, along with the signal for the actual real power delivered to bus $p$, $P_p$ to a unity gain inversion amplifier 101 to provide the signal for the real power error output $P_{ps}-P_p$, or $P_{pe}$. The signal for the actual real power delivered to bus $p$, $P_p$ is output from a unity gain inversion amplifier 102, which has as inputs the product signal $E_p{}^r (-I_{pG}{}^r)$ and the product signal $E_p{}^i (-I_{pG}{}^i)$. The product signal $E_p{}^r (-I_{pG}{}^r)$ is attained as an output from multiplication device 103 which has as inputs the signal for the real component of actual bus voltage from the bus $p$ module, $E_p{}^r$, and the signal for the negative of the real component of bus injection current, $-I_{pG}{}^r$. The product signal $E_p{}^i (-I_{pG}{}^i)$ is produced as an output from multiplication device 104.

The signal for the negative of the real component of bus generation current, $-I_{pG}{}^r$ is derived through integration of the real power error signal, $P_{pe}$. The error signal $p_{pe}$ is delivered to an inverting integrator 107 through gain element (resistor) 106 having a gain $K_l$. The output of inverting integrator 107 is a signal $-I_{pG}{}^r$.

The signal representing the negative of the imaginary component of bus generation current, $-I_{pG}{}^i$, is derived through integration of a squared voltage magnitude error signal, $E_{pe}{}^2$. The error signal $E_{pe}{}^2$ is generated as an output from an inverting unity gain amplifier 113 which has as inputs respective signals for the squares of the real and imaginary components of actual bus voltage $(E_p{}^r)^2$ and $(E_p{}^i)^2$ as the negative square of a signal representing sechedules bus voltage magnitude $-(E_{ps})^2$. The signal for the squared voltage component $(E_p{}^r)^2$ is output from a multiplication device 110 which has as a double input the signal representing the voltage component $E_p{}^r$. The signal for the squared voltage component $(E_p{}^i)^2$ is output from a multiplication device 111 which has as a double input a signal for the voltage component $E_p{}^i$. As shown, the squared voltage error signal, $E_{pe}{}^2$, is input to an inverting integrator 116 through a gain element (resistor) 114 having a gain of $K_2$.

Reference is now made to FIG. 8, which shows in greater schematic form the load module 52 preferably employed in the loadflow calculator 39. Shown input to a unity given inverting amplifier 120 are a scheduled real load power signal, $P_{psL}$, and the negative of an actual real load power signal, $-P_{pL}$. The negative of the actual real load power signal, $-P_{pL}$, is output from a unity gain inverting amplifier 121 which has as inputs the signal for the product of the real component of actual bus voltage $E_p{}^r$ and the real component of load current, $I_{pL}{}^r$, and the signal for the product of the imaginary component of bus voltage, $E_p{}^i$, and the imaginary component of load current, $I_{pL}{}^i$.

The product signal $E_p{}^r I_{pL}{}^r$ is output from a multiplication device 122 which has as inputs the signals for the real bus voltage component, $E_p{}^r$ and the real load current component $I_{pL}{}^r$. Similarly, the product signal $E_p{}^i I_{pL}{}^i$ is output from a multiplication device 123 which has as inputs the signals from the imaginary bus voltage component $E_p{}^i$ and the imaginary load current component $I_{pL}{}^i$.

As will be appreciated, the negative of a real load power error signal, $-P_{peL}$, is generated as an output from amplifier 120. This error signal is then input to an inverting integrator 124 through a gain element (resistor) 126 having a gain of $K_5$. The output of integrator 124 is the signal for the real load current component, $I_{pL}{}^r$.

Also shown in FIG. 8 is a unity gain inverting amplifier 130 having as inputs a scheduled reactive load power signal $Q_{psL}$ and the negative of an actual reactive load power signal, $-Q_{pL}$. The latter signal is output from a unity gain inverting amplifier 131 which has as inputs the signal representing the product of the imaginary bus voltage component, $E_p{}^i$, and the real load current component, $I_{pL}{}^r$, and the signal representing the product of the negative of the real bus voltage component, $-E_p{}^r$, and the imaginary load current component, $I_{pL}{}^i$.

As shown, the product signal $E_p{}^i I_{pL}{}^r$ is output from a multiplication device 132 which has as inputs the signals for the imaginary bus voltage component, $E_p{}^i$, and the real load current component $I_{pL}{}^r$. Similarly, the product signal $-E_p{}^r I_{pL}{}^i$ is output from a multiplication device 133 which has as inputs the signals for the negative of the real bus voltage component, $-E_p{}^r$, and the imaginary load current component, $I_{pL}{}^i$.

As will be appreciated, the negative of a reactive load power error signal, $-Q_{peL}$ is output from amplifier 130. This error signal is then input to an inverting integrator 134 through a gain element (resistor) 136 having a gain of $K_4$. The output of integrator 134 is the signal representing the imaginary component of load current, $I_{pL}{}^i$.

Figure 9:
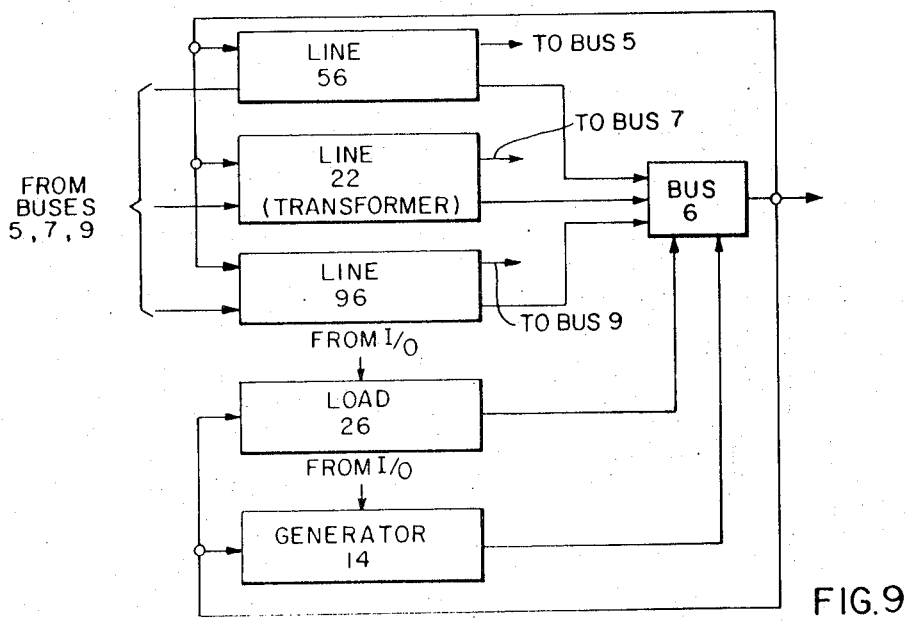
FIG. 9 shows an illustrative diagram of bus line generator and load modules interconnected.

Reference is now made to FIG. 9 for an illustrative example of the interconnection of bus, line, generator and load modules with regard to the network of FIG. 1 which represents part of a total model for loadflow solution. For illustrative purposes only, bus 6 of FIG. 1 has been chosen to show part of a modeled system. As will be seen from viewing FIG. 1, bus 6 connects to lines 56 and 96, transformer 22, generator 14 and load 26. Accordingly, modules representative of the above connect to a module representative of bus 6, as shown, delivering line, load and injection currents and receiving voltage. The line modules for lines 56, transformer 22 and line 96 also connect, respectively, to modules for buses 5, 7 and 9 (not shown) as can be seen from FIGS. 1 and 9. Both load module 26 and generator 14 connect to an I/O interface for receiving digitally or manually provided respective power and voltage magnitude constraints which may be achieved by digital /analog converter circuitry or by other suitable means such as manually adjusted potentiometers (not shown) which are manually set to predetermined generator voltage and power and load power constraint values.

From an overall standpoint with respect to FIG. 9 the modular system operates such that currents produced by the generator, load and line modules are summed at particular bus modules, which produce as outputs, bus voltage phasor signals to be delivered to particular generator, load and line modules. This all analog representation of the power system to be modeled through assignment and interconnection of modules allows for much faster loadflow solution because no iteration between the employed digital computer and the analog simulator is necessary.

LOADFLOW CALCULATOR CAPABLE OF HIGH SPEED TRANSIENT STABILITY COMPUTATIONS

INTRODUCTION

The ensuing description includes a disclosure of an all analog power system simulator having a predetermined arrangement of modular generator, bus, load and line circuits representative of actual system components. The simulator may be employed for both loadflow solution and transient stability analysis as a transient stability analyzer. It may be used for training and educational purposes in institutions such as universities in off-line studies; it may also be used for on-line or off-line studies of power systems in a hybrid computer arrangement. When used for training purposes a control panel interface is employed to provide system constraints to the analog circuitry and to set up and display transient conditions, such as three phase faults and transient drops, through fault signaling circuitry.

When a hybrid arrangement is employed, a digital computer provides system constraints to the analog simulator through digital-to-analog converter circuitry, receives system responses through analog-to-digital converter circuitry, guides the loadflow solution to convergence, imposes transient fault conditions through transient fault signal circuitry, and monitors system transient stability.

The digital computer may be connected to a data link to receive information from another computer to relieve the duty cycle of that computer. It can also be controlled through an operator mode to modify on-line input data, or through a study mode to impose contingency data on the analog simulator.

The advantages of all analog power system simulation include economy, modularity and greatly increased calculation speed. Further, it enhances training economy and presents an overall picture of system stability.

A. The Loadflow Solution

Figure 10A:
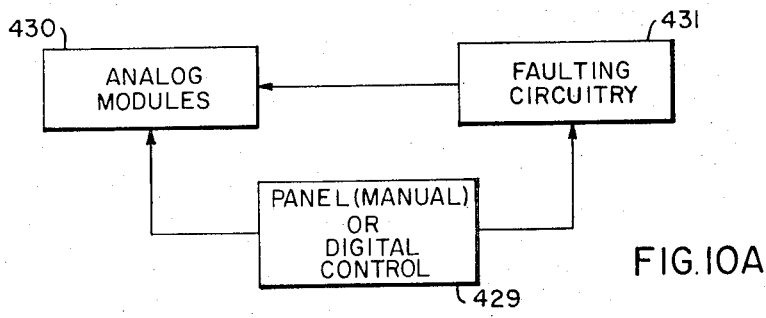
FIG. 10A shows a block diagram of a hybrid loadflow computer arrangement for use in transient stability analysis including transient fault signaling circuitry.
Figure 10:
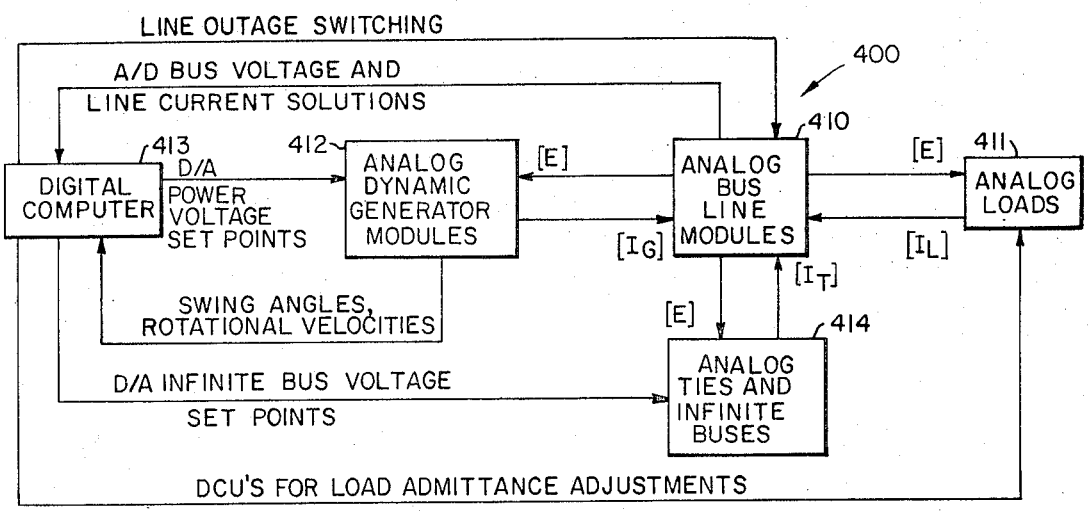
FIG. 10 shows a block diagram of a hybrid load flow computer arrangement for use in transient stability analysis wherein analog generator, load, tie line, bus and line modules are employed.

Reference is now made to FIG. 10 which illustrates a calculator system 400 which could be employed for on-line studies or for use in a training embodiment for computing loadflow solutions which also has transient stability computational capability. The loadflow solution is the attainment of a set of bus voltages under steady state conditions in accordance with predetermined system constraints; while transient stability computations include the computing of generator swing angles for stability monitoring during transient faults such as may be caused at the actual system. The calculator 400 employs analog bus and line modules similar to those described previously herein as indicated by reference numeral 410. Also represented by analog circuitry are the system loads preferably represented as constant admittance load modules somewhat different from the load model previously considered herein, as indicated by the block having reference numeral 411.

Analog dynamic generator modules constrain buses to which they connect and are indicated by the block having reference numeral 412. These generator modules may have varying degrees of complexity, and are capable of computing the transient behavior of the voltage and current phasors associated with them. As shown in FIG. 10, generator modules 412 differ somewhat from the generator model previously considered herein and are in this instance interfaced with a digital computer 413 by digital-analog converter circuitry, a function of the digital machine being to furnish voltage magnitude and power set points to the generator modules through stored data arrays to be described hereafter with respect to convergence of a loadflow solution.

The block having reference numeral 414 represents tie line modules which are, in effect, akin to transmission lines connected to the appropriate bus modules of block 410. At the ends of the tie lines are "infinite buses" which are represented as preselected fixed voltages, both in magnitude and angle for representation of external bus voltages effect from the external system to which the tie line connects. The appropriate coordinate components of these infinite bus voltages are established through predetermined stored data arrays, by the digital computer 413 through digital to analog converter circuitry.

The digital computer 413 receives and monitors bus voltage and line current solutions from the bus and line modules of block 410 through analog-digital converter circuitry. In addition, the digital computer 413 provides a line outage switching function for the line modules of block 410, as well as providing for load admittance adjustment for the load modules of block 411 through digital coefficient units. An address and function format is used to impose transient faults after steady state through a faulting circuitry to be described hereafter. It will be appreciated however, that any or all of the above-described functions of the digital computer 413 may be accomplished by any other suitable arrangement, such as analog circuitry, by those ordinarily skilled in the art.

From a further viewing of FIG. 10, it will be seen that the generator modules 412 provide one or more generation currents $[I_G]$ to the appropriate bus modules of the block 410. Similarly, the load modules of block 411 and tie line modules of block 414 provide, respectively, load currents $[I_L]$ and tie line currents $[I_T]$ to their associated and related bus modules of block 410. The bus modules of block 410, in turn, provide appropriate bus voltages $[E]$ to blocks 412, 411 and 414, respectively representing generation, load and tie line modules.

In the hybrid configuration of FIG. 10, a loadflow solution is obtained by an iterative process involving both digital and analog portions. The digital machine establishes voltage magnitude and real power set points for the generator modules at the beginning of the iterative process. These set points remain constant throughout the loadflow solution. At the beginning of the iterative process the digital machine sets load admittance values from a stored data array through digital coefficient units, and also sets infinite bus voltage values from stored data relating to tie real and reactive power flow. After an appropriate "settling time" an analog solution is made available to the digital computer by analog-digital converter circuitry. The digital computer then makes computations to determine whether load and tie line power constraints which are acquired through a data acquisition subsystem, are met. If not, the digital computer converges the iterative process toward a solution by manipulation of load admittance values and of tie external bus voltages to be described more fully hereinafter.

Reference is also made to FIG. 10A which shows a block diagram of a computer arrangement for transient stability analysis. A block 430 is shown to represent the aforementioned analog modules, and connects to a block 431 which may include either a digital computer for setting system constraints on the analog modules, converging the loadflow solution to steady state, imposing transient fault conditions through the transient fault signaling circuitry (to be described hereinafter) and monitoring transient results. The block 431 may alternatively include a control panel (to be described hereinafter) for use in training applications to attain the loadflow solution through manual manipulation, to manually impose transient faults through transient fault signaling circuitry, and to display transient results.

B. Transient Stability Calculations

Transient stability calculations pose vastly greater computational burdens than loadflow calculations in that transient stability is concerned with the dynamic behavior of generators, loads and tie lines under transient fault conditions such as three phase faults, transient drops, etc. and with system security under those conditions. Consideration of the transient stability problem further poses the question of the amount of computation which is to be allocated to analog computing equipment. While loads may be represented digitally for transient studies as well as steady state studies, the choice of digital load representation forces several iterative loadflow solutions for each time step of the transient solution or analysis. While computationally correct results may be achieved, such a choice leads to lengthy computations which can be avoided. Therefore, for transient stability studies there is preferably employed analog representation of loads. This choice allows execution of transient stability calculations without iteration, the implication being that only the implementation of generator modules is than a matter of selection when transient stability calculations are to be performed efficiently. For a faster-than-real time execution of the calculations, analog generator representation is preferably employed. For slower execution, generators may be represented conveniently by digital means as shown by the calculator 401 in FIG. 11 where the block 412 is omitted and programmed calculation of generator block outputs as a function of generator block inputs and constraints is provided.

As previously mentioned, the constant admittance load module is preferably employed in the calculator 400 for transient stability studies because a constant admittance load is the type most frequently used in transient studies. For a constant admittance load, the load computing module is interfaced to the digital computer by digital coefficient units, which enable the digital computer to establish and control values of resistive gains corresponding to load susceptance and conductance within the module to provide for load admittance manipulation to attain the loadflow solution, which will be more fully described hereafter.

Figure 11:
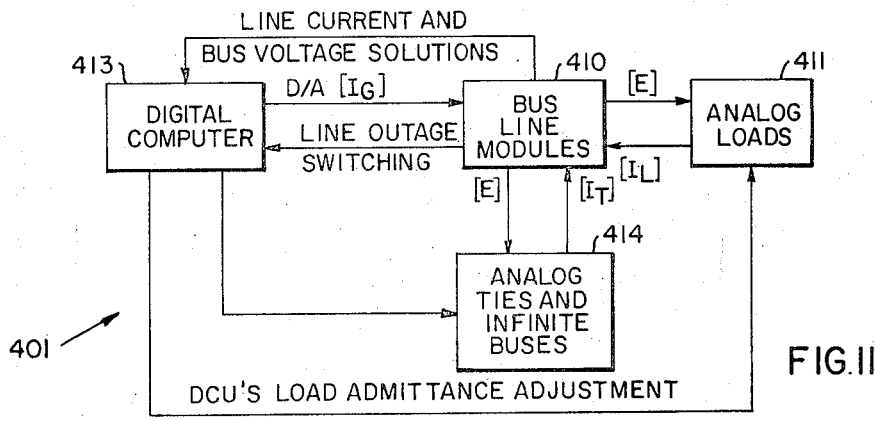
FIG. 11 shows a block diagram of a hybrid loadflow computer arrangement for use in transient stability analysis wherein generation effects are represented digitally.

The digital computer 413 of FIG. 10 and FIG. 11, or other suitable means, may be employed to initiate transient conditions after the system reaches a steady state loadflow solution and apply then to the network simulator through an address and function routine. Examples of such transient conditions are the imposition of a three phase fault to ground, the dropping of load or generation, or the faulting of a tie line. Transient conditions are only imposed after the loadflow solution is achieved because transient study results would be otherwise meaningless. The hybrid arrangement depicted may be employed for both simulation and training through use of additional application software to interface the digital machine with a dedicated training control panel.

DC CIRCUIT MODULES EMPLOYED FOR TRANSIENT STABILITY ANALYSIS OF AC ELECTRIC POWER NETWORK

A. Bus Module

Figure 12:
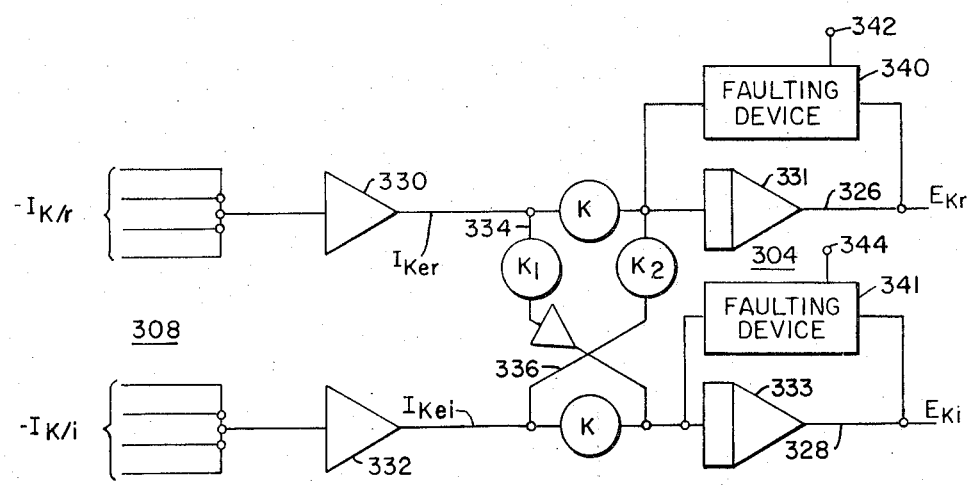
FIG. 12 shows a schematic diagram of a bus module used in the hybrid arrangement of FIG. 10.

The bus module preferably employed for transient stability analysis in the calculator 400 is similar to that disclosed in copending application Ser. No. 175,293 and described herein with regard to FIG. 3. However, circuitry for establishing a three phase fault at the bus is included. Reference is made therefore, to FIG. 12 which shows a more detailed schematic diagram of a bus module preferred for use in transient stability analysis.

Shown in FIG. 12 is the bus module 304 which includes summing circuitry 308. The summing circuitry 308 includes a real error current amplifier 330 and an imaginary error current amplifier 332. All of the input currents flowing into or out of the bus 304 are designated as real ($x$) and imaginary ($y$) quantities $-I_{k/r}$ and $-I_{k/i}$, respectively. Real and imaginary error currents $I_{ker}$ and $I_{kei}$ are generated as outputs from the amplifiers 330 and 332, respectively. A gain element $k$ (resistor) is employed for each phasor error current in each circuit channel 326 and 328. Cross-coupling error signal paths 334 and 336 with respective gain elements (resistors) $k1$ and $k2$ are employed for stabilization of the circuit operation. Integration of the phasor error currents to provide real and imaginary bus phasor voltages $E_{kr}$ and $E_{ki}$ is achieved through real and imaginary integrators 331 and 333. By processing phasor quantities in Cartesian coordinates, analog computation of sine and cosines in polar coordinates is avoided. Integration continues until the aforementioned phasor error currents are reduced to preselected values, ideally zero.

Also shown in FIG. 12 are real and imaginary faulting devices 340 and 341 respectively and preferably connected across real and imaginary current amplifiers 331 and 333. Each faulting device has an input 342 or 344 for receiving a three phase fault signal at the bus (through circuitry not shown in FIG. 12 but to be described hereinafter) and for simulation of an actual three phase fault at the end of any transmission line connected to the bus. Upon reception of the faulting signal at inputs 342 and 344 inputs to amplifiers 331 and 333 become grounded giving rise to zero amplifier outputs. It will be appreciated that while the faulting devices 340 and 341 are shown connected across integrators 331 and 333, they could be connected across single amplifiers employed for both summation and integration.

Figure 13A:
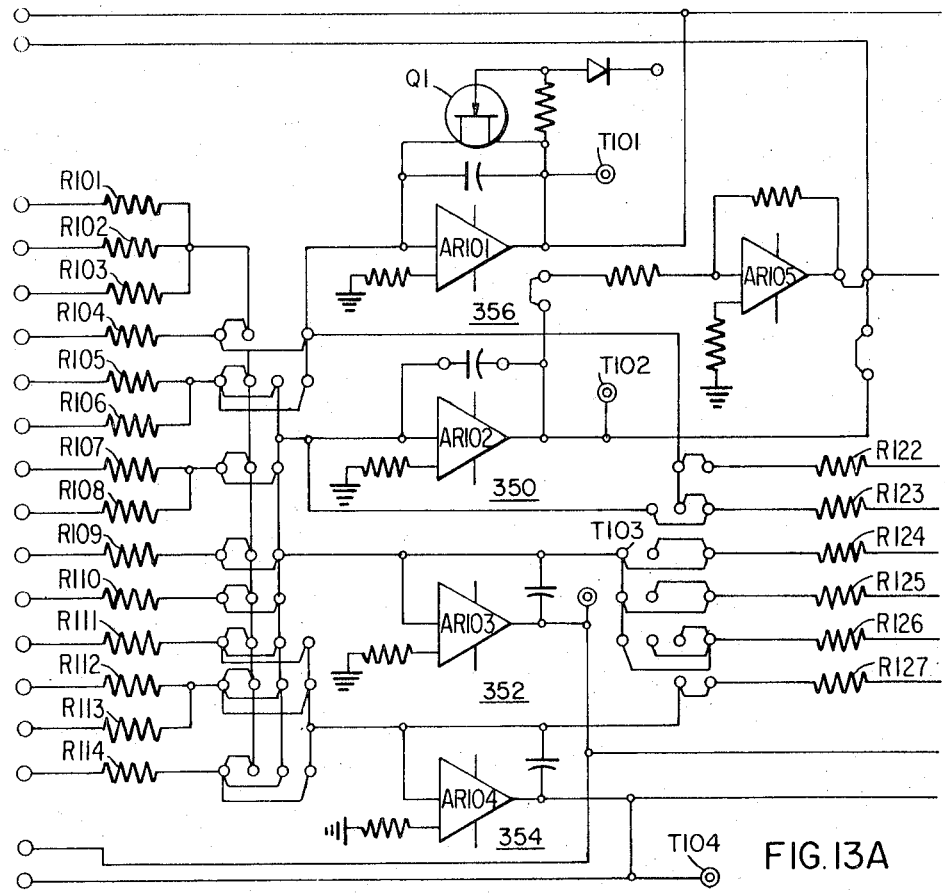
FIGS. 13A and 13B schematically show a printed circuit bus module card employed in the analog portion of the hybrid arrangement of FIG. 10.
Figure 13B:
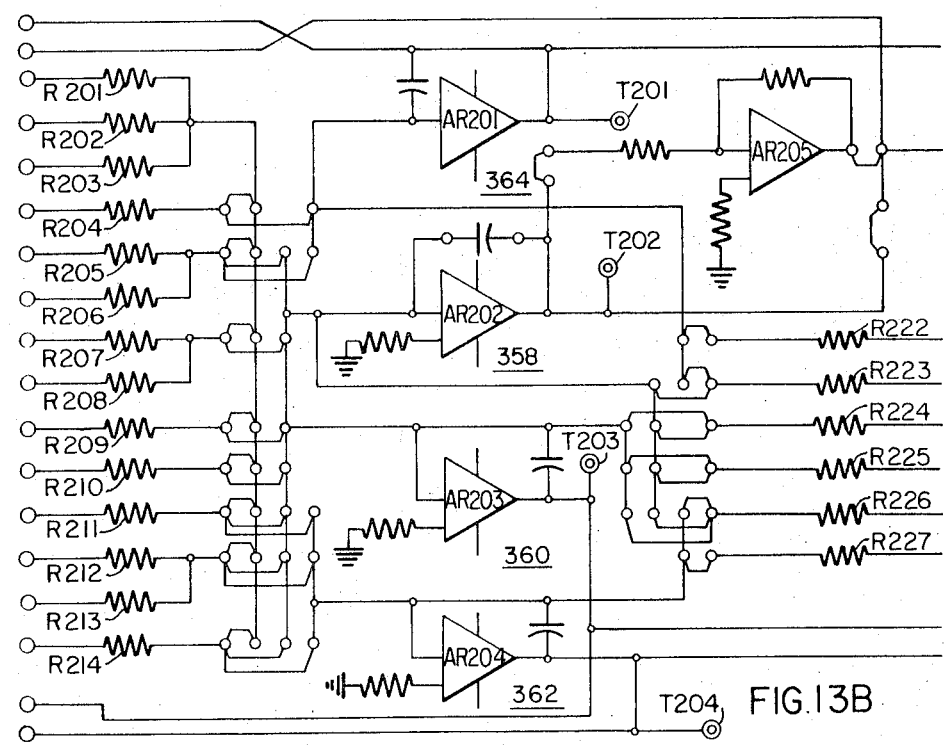

Reference is now made to FIGS. 13A and 13B which schematically show a printed circuit bus module card employed in the loadflow calculator capable of transient stability analysis. As shown in FIGS. 13A and 13B, each bus module card includes respective real current operational amplifier circuits 350, 352, 354 and 356 and imaginary current operational amplifier circuits 358, 360, 362 and 364 which function as summing integrator circuits. Integrated circuit operational amplifiers such as Amelco 741CE units are respectively employed as amplifier block elements AR101 through AR104 and AR201 through AR204 in the respective amplifier circuits. Amplifier block elements AR105 and AR205 and their respectively associated amplifier circuitry are not employed in the present embodiment of the invention.

As an overview, the circuitry of FIG. 13A provides real voltage computations while the circuitry of FIG. 13B provides imaginary voltage computations.

Currents transmitted from line and tie line cards (to be described more fully hereinafter) enter the bus card circuits through resistors R101 through R114 and R201 through R214. Jumpers provide for accommodation of varying numbers of line connections to a bus. Resistors R122 through R127 and R222 through R227 provide for entry of generator and load currents into the bus amplifiers for the generator and load cards (to be described more fully hereinafter).

Computed real and imaginary bus voltage components are generated at operational amplifier outputs designated by the symbols T101 through T104 and T201 through T204.

Also shown in FIGS. 13A and 13B are preferably solid state switching devices in the preferred form of field effect transistors such as Q1 is connected across each operational amplifier AR101 through AR104 and AR201 through AR204. The emitter electrodes of these field effect transistors are connected to faulting circuitry (not shown in FIG. 13A) for establishing bus three phase faults. Accordingly, a signal occurring at the emitter electrode of one or more of these field effect transistors would cause the associated field effect transistor to conduct and the output of the associated operational amplifier to go to zero, thus simulating the grounding of an actual system bus.

B. Line Module (Tie Line, Transformer)

Figure 14:
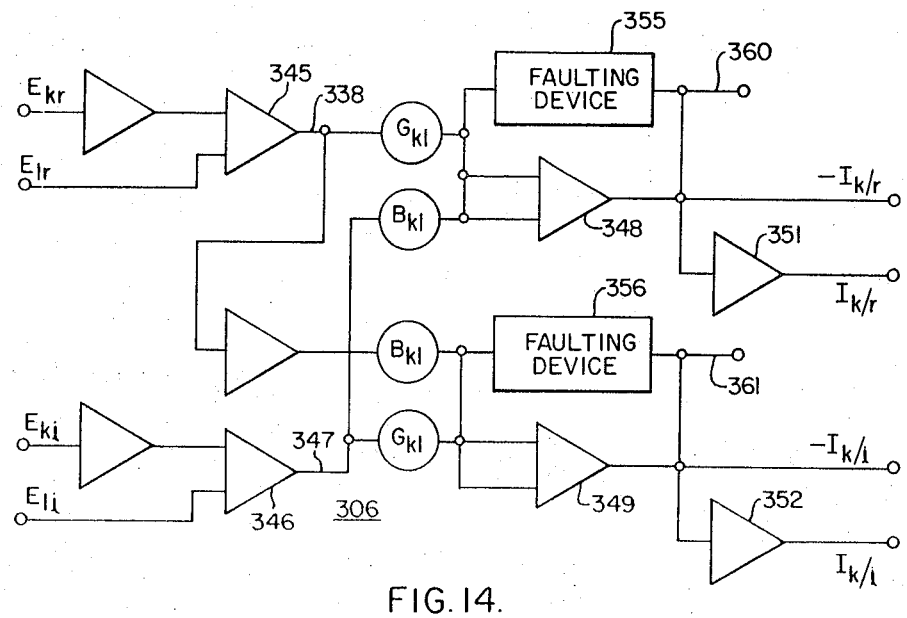
FIG. 14 shows a schematic diagram of a line module used in the hybrid arrangement of FIG. 10.

The line module employed in the calculator 400 for transient stability analysis is similar to that disclosed in copending application Ser. No. 175,293 and described herein with regard to FIG. 3. However, circuitry for establishing a three phase fault at a line, or a transient drop of a line, or the taking out of service of a line is included. Reference is made, therefore, to FIG. 14 which shows a more detailed schematic diagram the preferred arrangement of a line module usable in the transient stability analyzer.

Shown in FIG. 14 is a line module 306 provided with separate circuit channels 338 and 347 for the real and imaginary components of line current. Real bus voltages, $E_{kr}$ and $E_{lr}$, representative of the real components of bus voltages at the buses to which the line connects, are applied to a comparator amplifier 345 in the real signal channel 338. Imaginary bus voltages, $E_{ki}$ and $E_{li}$, representative of the imaginary components of bus voltage at the buses to which the line connects are applied to a comparator amplifier 346 in the imaginary signal channel 347. Output real and imaginary line currents, $-I_{kl/r}$ and $-I_{kl/i}$ and their complements are generated in correspondence to the phasor bus voltage differences by amplifiers 348, 351, 349 and 352 for application to bus modules. The quantities $G_{kl}$ and $B_{kl}$ represent gain elements (resistors) which are dependent on real and reactive components of the simulated line series branch admittance.

Also shown in FIG. 14 are real and imaginary faulting devices 355 and 356, respectively connected across real and imaginary amplifiers 348 and 349 for simulation of clearance of the physical line during a three phase fault, a transient drop, or removal of a line from the system because of an environmental mishap. Each faulting device has an input 360 and 361 for receiving a line three phase fault signal, or a line transient drop signal, or line out of service signal at the line (through circuitry not shown in FIG. 14 but to be described hereinafter). Upon reception of their respective input signals, the faulting devices cause their respectively associated amplifiers to have zero outputs.

Figure 15A:
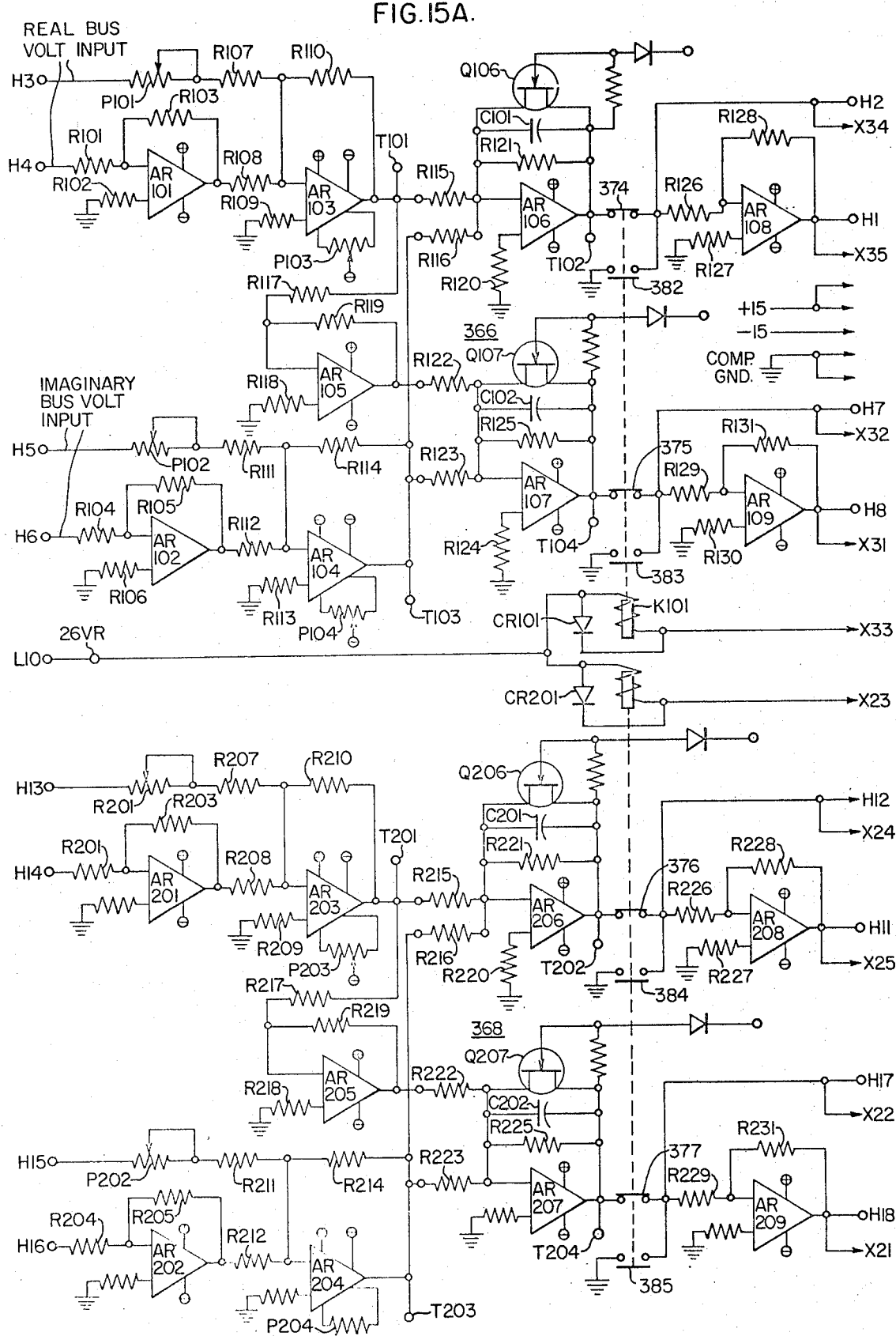
FIGS. 15A and 15B schematically show a printed circuit line module card employed in the analog portion of the hybrid arrangement of FIG. 10.
Figure 15B:
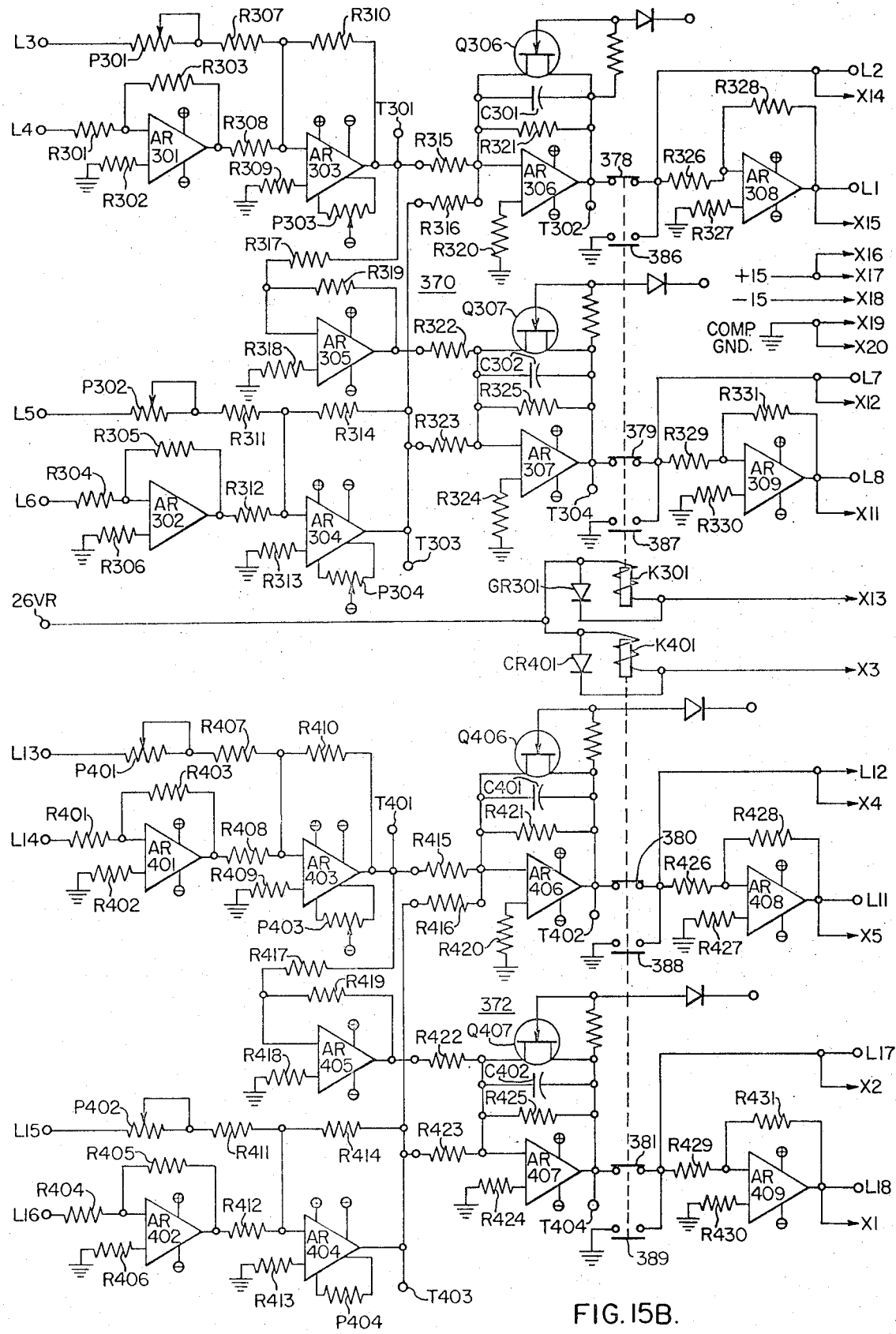

Reference is now made to FIGS. 15A and 15B which schematically show a printed circuit line module card employed in the loadflow calculator capable of transient stability analysis. As shown in FIGS. 15A and 15B, each line card includes four modular circuits which provide for simulating four lines in a given power network such as that shown in FIG. 1. Respective line simulating circuits 366, 368, 370 and 372 include circuit elements representing an implementation of the schematic circuit described in connection with FIG. 14. In each modular line circuit, the upper part of the circuitry carries real line current and the lower part of the circuitry carries imaginary line current.

Since each line module is connected to two bus modules, a total of four input connections are required to process both real and imaginary currents in the line module. Accordingly, the bus voltage inputs are applied through resistors R101 and R104, R201 and R204, etc., and potentiometers P101 and P102, P201 and P202, etc. in the modular circuits of FIGS. 15A and 15B. Amplifiers AR101, AR102, AR201, AR202, etc., operate as inverters on one of the two input bus voltages to each line module so as to provide for current flow out of one and into the other of the two line connected bus modules. Amplifiers AR103, AR104, AR203, AR204, etc., develop the bus voltage difference.

All line cards are interchangeable except that conductance resistors R115, R123 and susceptance resistors R116 and R122 and similar resistors R215, R216, R222, R223, etc., are modified to reflect the particular series branch admittance of the simulated lines.

To provide for line three phase faults, or line out of service, or line transient drop, relays K101, K201, etc., are included in the line card. The line removal relays are double pole, double throw devices and may be operated by a digital line outage system or other suitable means. Normally closed relay contacts 374 through 381 and normally open relay contacts 382 through 389 simultaneously ground the inputs of amplifiers AR108, AR109 or AR208, AR209, etc., and open outputs of preceding stage amplifiers when particular line outages are to be implemented. This use of relays for line outage functions for disconnecting a line from a bus to relieve a fault condition or to remove a line from service is preferably implemented when the calculator is working under real time conditions. Under faster than real time conditions, field effect transistors are employed because the relays do not operate quickly enough.

When operating at faster than real time conditions it is desirable to short system relays via shorts (not shown), and implement the line outage function by preferably solid state switches in the preferred form of field effect transistors Q106, Q107, etc., shown connected across amplifiers AR106, AR107, etc. The emitter electrodes of each of these field effect transistors are connected to fault signaling circuitry (not shown in FIGS. 15A and 15B but to be described hereinafter). The reception of a signal from the fault signaling circuitry at the emitter electrode of a field effect transistor (FET) will cause the FET to conduct and its associated amplifier output to go to zero, thus simulating a three phase fault, or a transient drop or removal of an actual system line.

Transformers shown in the network of FIG. 1 are represented by line modules. It will be appreciated by those skilled in the art that a transformer has a Pi section impedance equivalent which may be represented at nominal turns ratio, and, in this case by a line module having gain resistor values which reflect the admittance corresponding to the series resistance and inductance of the Pi transformer equivalent.

Tie lines shown in the network of FIG. 1 are also represented by line modules constrained at one end by external infinite bus voltages preferably chosen to initially have the same voltage value as a bus chosen to be a slack bus with voltage at one per unit at zero angle. During convergence of the loadflow solution external tie voltages are guided by the digital machine to meet tie power constraints.

C. Load Module

Figure 16:
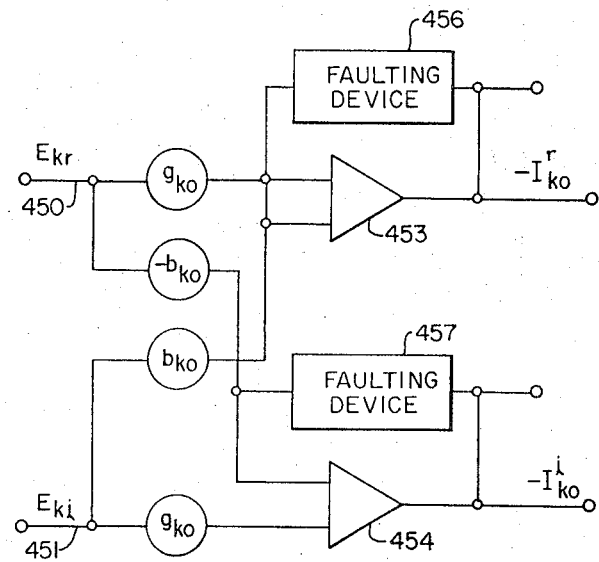
FIG. 16 shows a schematic diagram of a load module used in the hybrid arrangement of FIG. 10.

The load module employed in the calculator 400 for transient stability analysis is shown in schematic form in FIG. 16. In the preferred embodiment a constant admittance load module is employed. As shown in FIG. 16 the load module circuit includes separate circuit channels 450 and 451 for processing real and imaginary components of the load current from the bus through the load to ground. A real bus voltage $E_{kr}$ and imaginary bus voltage $E_{ki}$ are input to circuit channels 450 and 451, respectively. output real and imaginary load currents $-I_{ko}{}^r$ and $-I_{ko}{}^i$ are generated in correspondence to the phasor bus voltages by amplifiers 453 and 454, respectively in accordance with the load current equations $I_{ko}{}^r = g_{ko} E_{kr} + b_{ko} E_{ki}$ and $I_{ko}{}^i = g_{ko} E_{ki} - b_{ko} E_{kr}$. The coefficients $g_{ko}$ and $b_{ko}$ respectively represent gain elements dependent upon load conductance and load susceptance. These values, as was noted earlier, are varied to attain a loadflow solution, which variation may be obtained through employment of potentiometers set by an operator or by digital coefficient units where a digital computer is interfaced with the instant network calculator.

Also shown in FIG. 16 are real and imaginary faulting devices 456 and 457 respectively connected across amplifiers 453 and 454. These devices are connected to fault signaling circuitry (not shown in FIG. 16) for the reception of faulting signals for institution of load faults which may be simulated as actual loads out of service or under transient load drop. A signal received by a faulting device will cause the output of its associated amplifier to become grounded simulating an open load circuit.

Figure 17A:
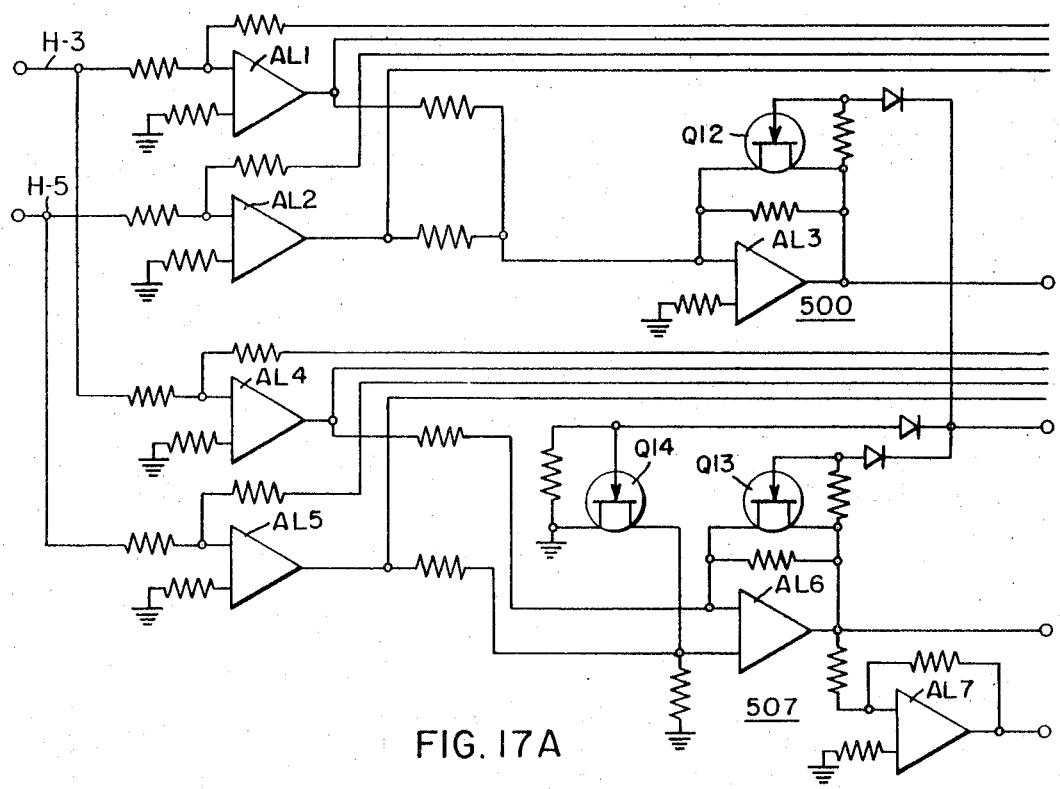
FIGS. 17A, 17B and 17C schematically show a printed circuit load module card employed in the analog portion of the hybrid arrangement of FIG. 10.
Figure 17B:
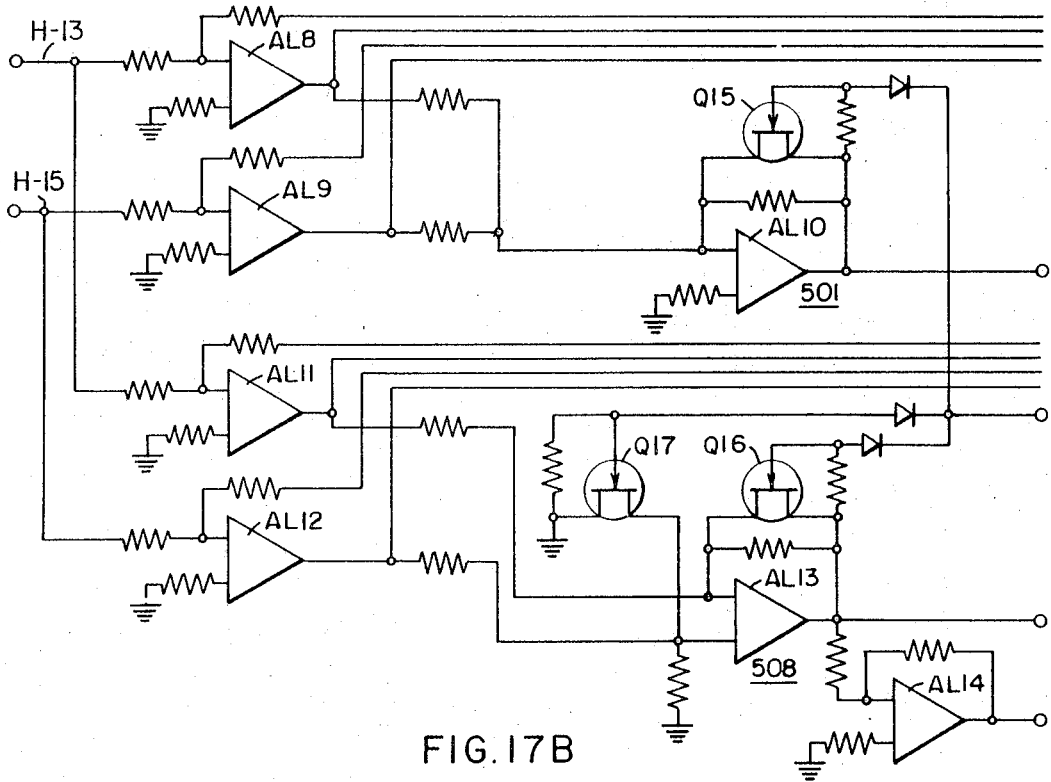
Figure 17C:
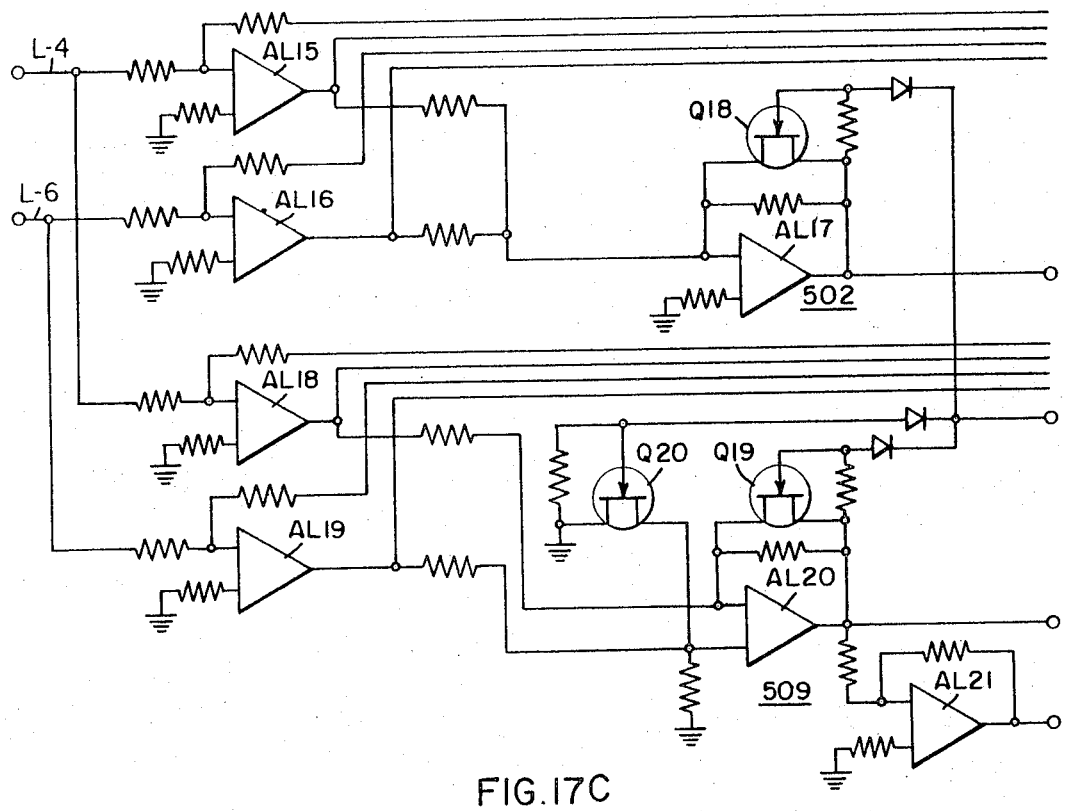

Reference is now made to FIG. 17 which shows in schematic form a printed circuit card containing load modules representative of the loads at the Philadelphia, Washington and Wheeling Stations of the illustrative power system of FIG. 1. As shown in FIG. 17, the load module card includes respective real current operational amplifier circuits 500, 501 and 502 and imaginary current operational amplifier circuits 507, 508 and 509. Real bus voltages are input to the respective load modules at points H-3 to operational amplifiers AL1 and AL4, H13 to operational amplifiers AL8 and AL11 and L-4 to operational amplifiers AL15 and AL18 and imaginary bus voltages are input to the respective load modules at points H-5 to operational amplifiers AL2 and AL5, H-15 to operational amplifiers AL9 and AL12 and L-6 to operational amplifiers AL16 and AL19. The amplifiers AL1, AL5, AL8, AL12, AL15 and AL19 have initially estimated adjustable gains which may be varied under digital or manual control and are representative of associated load conductance at their respective bus voltage inputs. Amplifiers AL2, AL4, AL9, AL11, AL16 and AL18 have adjustable gains representative of associated load susceptance at their respective bus voltage inputs.

The outputs of amplifiers AL1 and AL2, AL8 and AL9, and AL15 and AL16 are respectively input to real load current summation operational amplifiers AL3, AL10 and AL17, to be summed for which generation of associated real load current components. Similarly, the outputs of amplifiers AL4, AL5, AL11 and AL12, and AL18 and AL19 are respectively input to imaginary load current differential operational amplifiers AL6, AL13 and AL20, to be differenced for generation of the negatives of associated imaginary load current components due to an inherent inversion associated with these amplifiers. Inverter amplifiers AL7, AL14 and AL21 respectively receive the outputs from amplifiers AL6, AL13 and AL20 for generation of the positives of associated imaginary load currents.

Shown connected across summation amplifiers AL3, AL10 and AL17 are preferably solid state switches in the preferred form of field effect transistors Q12, Q15 and Q18, which field effect transistors have their emitter electrodes connected to the previously mentioned load fault signaling circuitry, not shown in FIG. 17. Upon reception of a fault signal, these transistors are gated on thereby equalizing the level of the respective inputs to which they are connected with the respective amplifier outputs, such that the outputs are forced to attain the input voltage value which is a virtual ground. Accordingly, an open load circuit is simulated.

With respect to summation amplifiers AL6, AL13 and AL20 preferred field effect transistors Q13, Q16 and Q19 are shown respectively connected from one input to the output of the differential amplifiers, while preferred field effect transistors Q14, Q17 and Q20 are shown connected across the other respective inputs of differential amplifiers AL6, AL13 and AL20. Each of the field effect transistors Q13, Q16, Q19 and Q14, Q17, Q20 have their emitter electrodes connected to the previously described transient fault signaling circuitry for simulation of faults at actual system loads.

Accordingly, upon reception of a fault signal from the fault signaling circuitry, field effect transistors Q13, Q16, Q19 and Q14, Q17, Q20 will be gated on. The conduction of transistors Q14, Q17 and Q20 will cause the respective inputs to which they connect to become grounded as shown. The conduction of transistors Q13, Q16 and Q19 will cause the respective inputs to which they connect to be at the same level as the respective outputs to which they connect, that level being a virtual ground because of the nature of the inputs of differential amplifiers.

D. Generator Module

Figure 18:
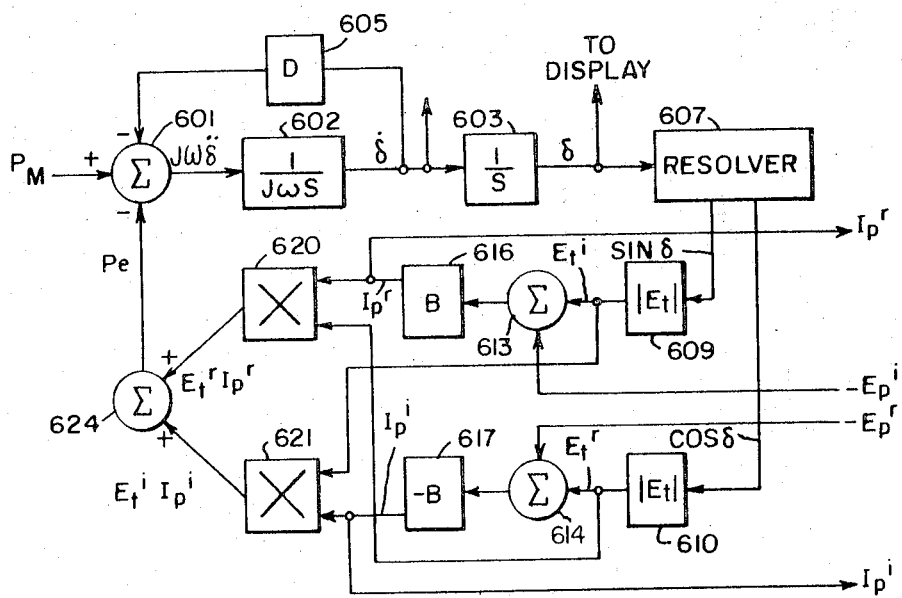
FIG. 18 shows a schematic diagram of a generator module used in the hybrid arrangement of FIG. 10.

A preferred embodiment of a generator module which is employed in the calculator 400 for transient stability analysis computations in the analyzer is illustrated in block diagram form in FIG. 18. The module depicted is that of a synchronous generator of constant voltage behind transient reactance. Reference is made to page 366 of the book *Computer Methods In Power System Analysis*, Staggs and El Abiad, McGraw-Hill Publishing Co., 1968, for an explanation of the parameters involved in deriving generator swing angles and rotation of velocities for generators of this class. As shown in FIG. 18, generator mechanical power, $P_m$, and the negative of generator electrical power, $-P_e$, are input to a summation device 601 to yield the quantity $J\omega\delta$, where $J$ is equal to the rotational moment of inertia of the generator, $\omega$ is equal to the generator rotor angular velocity and $\delta$ is equal to the generator rotor angular acceleration. The quantity $J\omega\delta$ is input to an integrating device 602 having a gain of $(1/J\omega)$ to yield an output $\delta$ which is equal to the generator rotor angular velocity. The output $\delta$ is input to a second integrating device 603 to yield an output $\delta$ which is equal to the generator machine or swing angle referenced to fixed system coordinates. The generator swing angle $\delta$ is an indication of the rotation of the generator internal voltage phasor with respect to the slack bus under transient conditions. It is studied to determine whether it has swung to instability under transient conditions. Also shown input to summation device 601 is a damping input $D\delta$, generated by sending the generator rotor angular velocity $\delta$ through damping device 605. "D" represents the generator damping coefficient which is useful to bring generator quickly to a steady state power condition corresponding to a preselected magawatt set point, for example, during a loadflow solution.

The generator swing angle $\delta$ is delivered as an input to a resolver circuit 607, which computes voltage sine output signals analogous to sine $\delta$ and cosine $\delta$. The resolver circuit may be any suitable circuit for generating the trigonometric sine and cosine functions of an input angle. The resolver output, sine $\delta$ is input to a gain device 609 having a gain equal to the generator terminal voltage magnitude $E_t$. Accordingly, the output of gain device 609 is $E_t$ sine $\delta$, or the imaginary component of general terminal voltage $E_t^i$. Similarly, resolver output cos $\delta$ is input to gain device 610 having a gain, $E_t$. The output of gain device 610 is $E_t$ cos $\delta$, or the real component of generator terminal voltage $E_t^r$.

The imaginary component of generator terminal voltage $E_t^i$, is input along with the negative imaginary component of the bus voltage at the bus to which the generator connects, $-E_p^i$, into a summing device 613. The output of summing device 613 is, accordingly $E_t^i - E_p^i$, and is input to a gain device 616 having a gain B equal to the transient reactance of the modeled generator. Actually, the transient reactance includes a conductance component which is very much less than the susceptance component B, and therefore is disregarded. The output of gain device 616 is the real component of generation current $I_p^r$ in accordance with the relationship $I_p^r = B(E_t^i - E_p^i)$. The output $I_p^r$ is input to a multiplication device 620, along with the real component of generator terminal voltage $E_t^r$. The multiplication device 620 produces an output which is the product $E_t^r I_p^r$ representing a generation signal corresponding to one component of generator electrical power delivered to a bus to which the generator is connected.

The real component of generator terminal voltage, $E_t^r$ is input along with the negative real component of the bus voltage at the bus to which the generator connects $-E_p^r$, into a summing device 614. The output of summing device 614 is, accordingly $E_t^r - E_p^r$, and is input to a gain device 617 having a gain $-B$. The output of gain device 617 is the imaginary component of generation current, $I_p^i$ in accordance with the relationship $I_p^i = -B(E_t^r - E_p^r)$. The output $I_p^i$ is input to a multiplication device 621, along with the imaginary component of generator terminal voltage $E_t^i$. The multiplication device 621 produces an output which is the product $E_t^i I_p^i$ representing a generation signal corresponding to component of generator electrical power delivered to a bus to which the generator is connected.

As shown, the outputs $E_t^r I_p^r$ and $E_t^i I_p^i$ from multiplication devices 620 and 621, respectively, are input to a summing device 624 to yield the generator electrical power $P_e$ in accordance with the relationship $P_e = E_t^r I_p^r + E_t^i I_p^i$; that is, generator electrical power is equal to the sum of its real and imaginary components.

Figure 19:
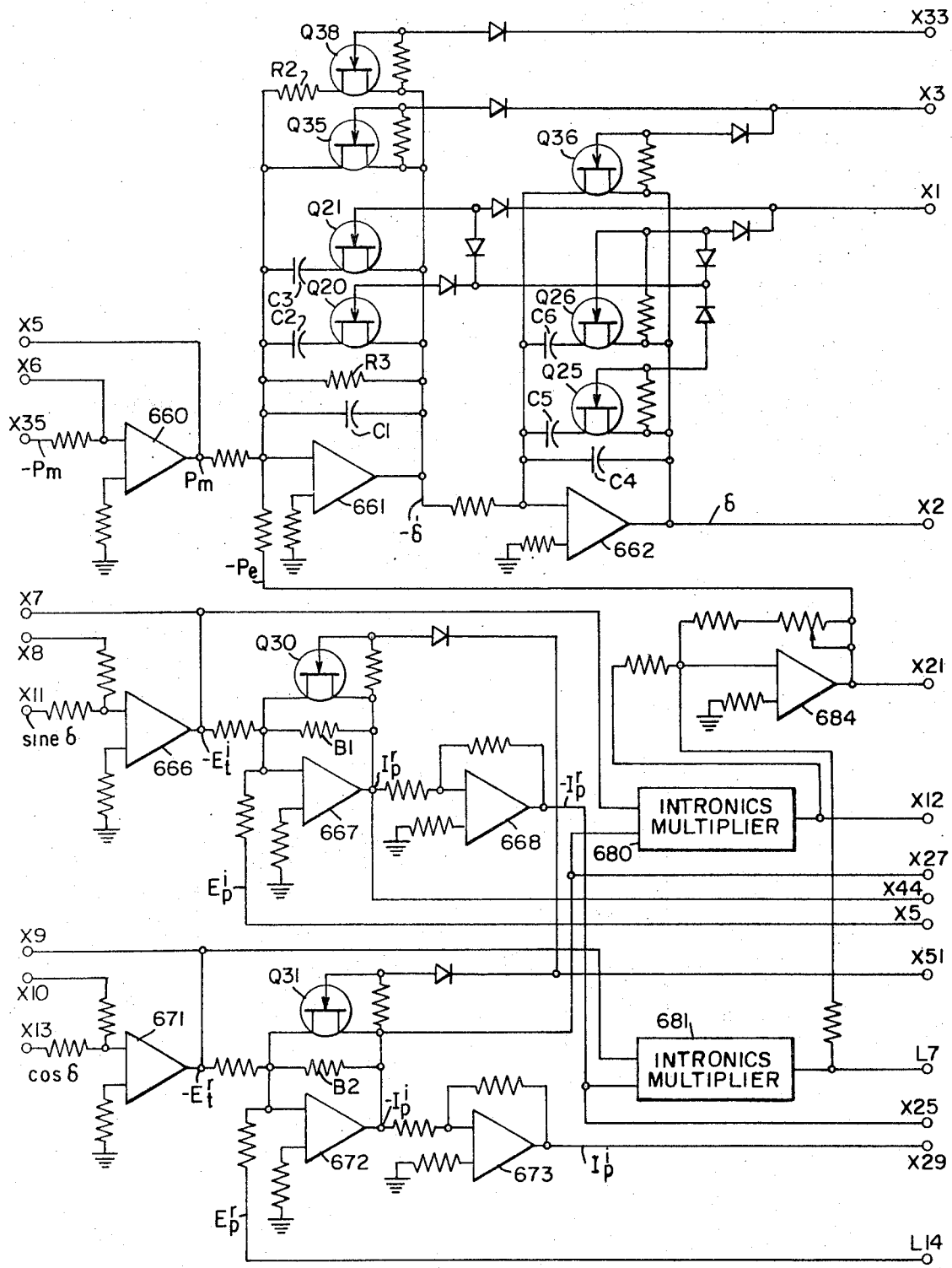
FIG. 19 shows a more detailed schematic diagram of a generator module used in the analog portion of the hybrid arrangement of FIG. 10.

Not shown in FIG. 18, but to be described in FIG. 19 is generator faulting circuitry to establish generation out of service or generation drop. Reference is now made, therefore, to FIG. 19 which shows in more detailed schematic form the preferred generator module employed for transient stability analysis excluding the aforementioned conventional resolver. Shown input to a unity gain operational amplifier inverter 660 is a negative generator mechanical power signal $-P_m$. The output of amplifier 660 is accordingly $P_m$. The $P_m$ signal is input to a summing integration amplifier 661 along with a negative generator electrical power signal $-P_e$. Resistor $R_3$, which is connected across amplifier 661 is a damping element representing the generator damping coefficient. Capacitors C1, C2 and C3 are employed for varying the time constant to accommodate operation at real time, 10 times faster than real time and 50 times faster than real time. The capacitor C2 and C3 is connected across amplifier 661 whenever the emitter electrode of its associatively connected field effect transistor Q20 or Q21 is gated on from a clock in the faulting circuitry (not shown) whenever operation at faster than real time is desired.

The output of amplifier 661 is $-\delta$, or the negative of generator rotor angular velocity. The $-\delta$ signal is input to operational amplifier integrator 662, which produces an output $\delta$ corresponding to the generator swing angle. It will be appreciated that capacitors C5 and C6, which are connected across the amplifier 662 are associatively connected to the field effect transistors Q25 and Q26 for time constant variation capabilities similar to those described with respect to amplifier 661. The output generator swing angle, $\delta$, may be delivered to any suitable indication device such as a cathode ray tube. It is the variation of the angle δ that is a principal quantity to be observed for stability analysis purposes concerned with herein.

Also shown in FIG. 19, entering as an input to operational amplifier 666 having a gain of $E_t$ is the signal sine δ (from resolver). Accordingly, the output of amplifiers 666 is $- E_t$ sine δ, or the negative of the imaginary component of generator terminal voltage, $-E_t^i$. The $-E_t^i$ signal is input, along with the imaginary component of bus voltage at the bus to which the generator connects, $E_p^i$, to summation amplifier 667 having a gain of B, the generator transient reactance, established by resistor B1 connected across amplifier 667. Accordingly, the output of the amplifier 667 is $-B(E_p^i - E_t^i) = B(E_t^i - E_p^i) = I_p^r$, the real component of generation current. The current signal $I_p^r$ is input to an operational amplifier inverter 668 which produces an output signal, $-I_p^r$.

Shown entering as an input to operational amplifier 671 having a gain of $E_t$ is the signal cos δ (from resolver). Accordingly, the output of amplifier 671 is $- E_t$ cos δ, or the negative of the real component of generator terminal voltage, $-E_t^r$. The $-E_t^r$ signal is input, along with the real component of bus voltage at the bus to which the generator connects, $E_p^r$, to summation amplifier 672 having a gain of B established by resistor B2 connected across amplifier 672. Accordingly, the output of amplifier 672 is $-B(-E_t^r + E_p^r) = B(E_t^r - E_p^r) = -I_p^i$, the negative of the imaginary component of generation current. The current signal, $-I_p^i$, is input to operational amplifier inverter 673 which produces an output signal, $I_p^i$.

As shown, the current signal, $-I_p^i$, is input along with the generator terminal voltage signal $-E_t^i$, to a multiplication device 680. The multiplication device 680 produces as an output the product of its inputs, $E_t^i I_p^i$. Shown entering as inputs to a multiplication device 681 are the current signal, $-I_p^r$, and the generator terminal voltage signal, $-E_t^r$. The output of multiplication device 681 is, therefore, $E_t^r I_p^r$.

The output signals $E_t^r I_p^r$ and $E_t^i I_p^i$, respectively from multiplication devices 681 and 680 are input to a summation amplifier 684, which has an output signal $-P_e$ delivered to summation amplifier 661 as previously described.

Also shown in FIG. 19 are field effect transistors Q30 and Q31 connected to fault signaling circuitry (not shown) for the reception of generation out-of-service (total generation loss) or generation transient drop (sudden generation loss) signals. The presence of a fault signal at the FET emitter electrodes will cause the amplifier outputs to which the respective field effect transistors are connected to become virtually grounded and the respective amplifier outputs ($I_p^r$ and $I_p^i$) to go to zero, thereby simulating generator drop or generation out of service. Accordingly, zero electrical power from the actual generator is also simulated.

Also depicted in FIG. 19 are field effect transistors Q35 and Q36, respectively connected across amplifiers 661 and 662, and having their emitter electrodes connected to a reset signal device (not shown). Whenever a system reset is desired, a reset signal appearing at the emitter electrodes of field effect transistors Q35 and Q36 will cause the associated amplifier outputs to which the transistors are connected to become grounded and the amplifier outputs to go to zero. This causes a reset of the associated generator swing angle to zero when the generator goes unstable to reinitialize the generator swing angle for the next set of data. This reset is implemented manually through switching circuitry (not shown) and could also be achieved digitally.

A field effect transistor Q38 is employed in series with resistor R2, the serial combination connected across amplifier 661 to provide an increased damping to reinitializing the associated generator swing angle to zero when the generator remains stable for the next set of data under the same set of data. A damp signal from the faulting circuitry (not shown) at the emitter electrode of field effect transistor Q38 initiates this damping effect. The resistor R2 speeds the response of the amplifier to return to initial conditions before the subsequent application of a transient condition.

E. Faulting Circuitry For All Analog Transient Analysis

Figure 20:
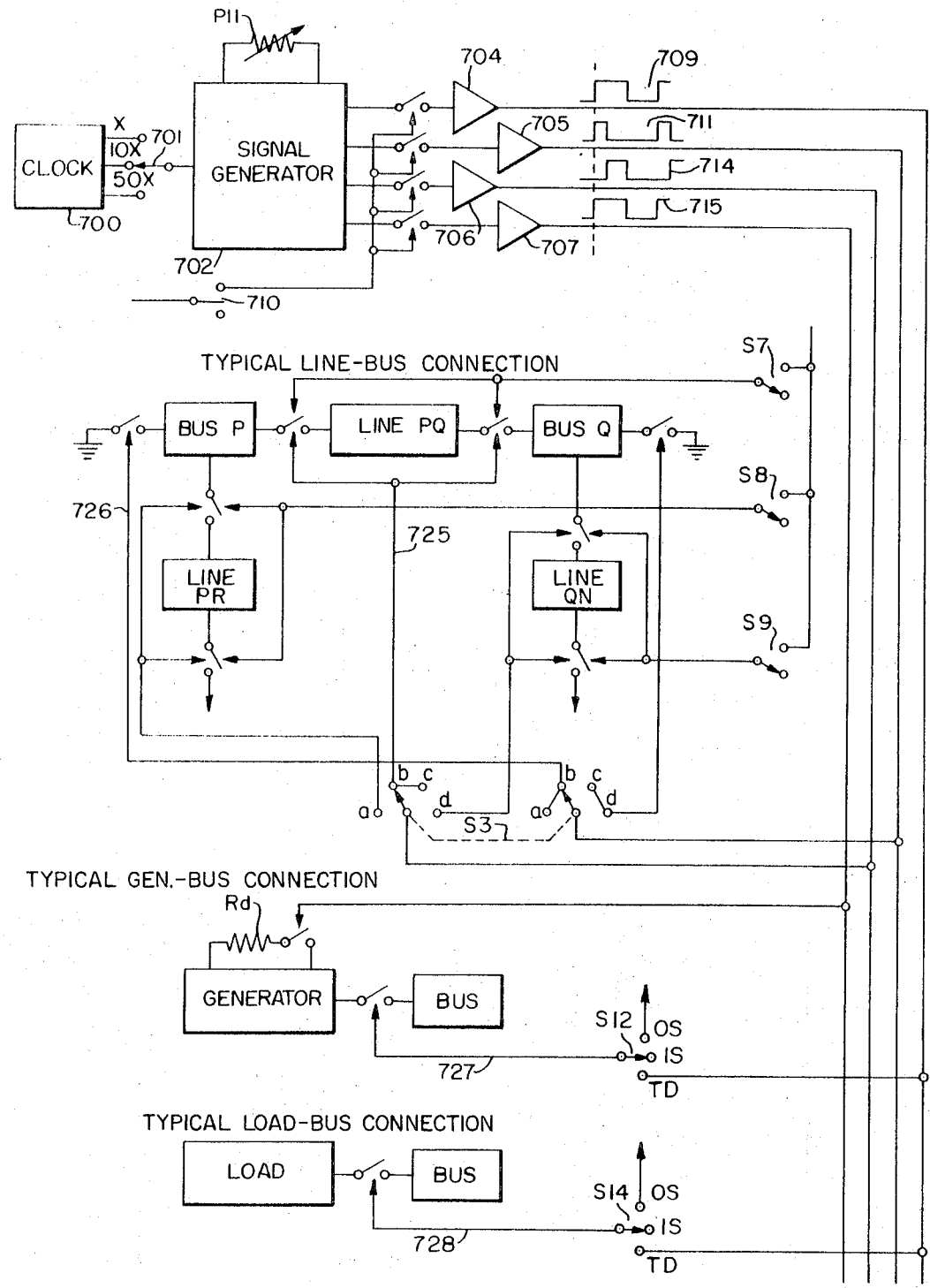
FIG. 20 shows a schematic diagram of transient fault signaling circuitry employed for transient stability analysis in conjunction with the analog portion of the hybrid arrangement of FIG. 10.

Reference is now made to FIG. 20 which sets forth in schematic form the preferred form of hardwired fault signaling circuitry employed for transient stability analysis in the preferred analyzer described herein. Fault signaling circuitry can be manually controlled or digitally controlled by addressing an interfacing controller, which accepts addresses of buses, generators, loads, lines and tie lines. (See Appendix) As shown in FIG. 20, a conventional clock 700 is connected through a switch 701 to a signal generator 702. The clock 700 has three outputs corresponding to three positions of switch 701 for system operation at real time, 10 times faster than real time and 50 times faster than real time. The signal generator 702 provides four outputs to be delivered to switch driver circuits 704, 705, 706 and 707 whenever switch 710, which has steady state and transient position, is in the latter position through digital or operator control. Outputs from each of switch driving circuits 704, 705, 706 and 707 are, respectively, a transient drop pulse train 709, a bus three phase fault pulse train 711, a line three phase fault pulse train 714 and a "damp" pulse train 715. Pulse trains are employed for enchancement of observation of generator swing angles under transient conditions.

The leading edge of a pulse in the transient drop pulse train initiates a failure at a generator, a load, a tie line or possibly at a transmission line simulating a sudden loss of generation, load or tie line. The transient drop persists for the pulse duration, at the end of which restoration occurs. The bus three phase fault train 711 and the line three phase fault (to ground) pulse train 714 have time displacement such that a faulted line is not cleared disconnected from the transmission system until the end of a bus fault at the bus to which the particular line connects. The amount of time for a bus fault is the pulse duration of the bus three phase fault pulse train 711 and is labeled the "fault clearing time."

A potentiometer P11, connected to the signal generator 702, provides for adjustment of the fault duration time. Adjustment capability is desirable because the physical breakers in the actual transmission system have different clearing times. Adjustment for simulation purposes can be done manually or under digital control. Practically speaking, the fault duration time is the time elapsing before the relays K101, K102, etc. in FIGS. 15A and 15B sense the presence of a line three phase fault to ground.

The "damp" pulse train 715 is employed to restore system generators to system initial conditions as previously described.

Attention is now drawn to the area of FIG. 20 labeled "TYPICAL LINE-BUS CONNECTION." In particular, attention is drawn to this typical line bus connection in the analog simulator schematic to illustrate what occurs whenever a line three phase fault to ground is experienced in an electric power system. As shown, line pq connects to buses p and q, line pr connects to bus p and a bus r (not shown) and line qn connects to bus q and a bus n (not shown). Let it be assumed that a three phase fault to ground occurs at line pq. A switch S3, which is shown as a two deck switch having four positions (a, b, c and d) is associatively connected to receive the bus three phase fault and line three phase fault to ground pulse train signals, and is accordingly placed in position b for the imposition of a three phase fault at line pq.

It should be noted at this time that shown in FIG. 20 are what appear to be variously positioned mechanical contact points. These contact points are employed for illustrative purposes only so as to more clearly depict the removal of lines, generators or loads, or the grounding of buses. In actuality, these actions occur through the delivery of the pulse trains 709, 711 and 714 to the various previously described faulting devices associated with generator, line, bus and load modules.

With switch S3 in position b, it will be appreciated that the bus three phase fault pulse train 711 is delivered to connector 726 thereby causing the bus p to become grounded for the aforementioned fault duration time. At the end of the fault duration time the bus p is disconnected from ground and the line three phase fault pulse train 714 which is delivered through connector 725 will cause the line pq to be disconnected from bus p and bus q thereby simulating the actual occurrence of events in the physical system. Different positioning of the switch S3 will operate to impose three phase line faults to ground at correspondingly different lines.

Also shown are switches S7, S8 and S9 which are two-position switches for line "in service" (IS) or line "out of service" (OS). The line "out of service" position overrides any line three phase fault condition and removes the associated line from the system. The out of service function can be performed through the fault circuitry or through the previously mentioned digitally controlled line outage function. This line outage function is more fully explained in copending application Ser. No. 175,286. It should be noted that while line transient drops may be imposed also, circuitry has not been depicted for that type of transient fault with respect to system lines. Accordingly, it should also be noted that a transient drop pulse would disconnect the appropriate line from the buses to which it originally connected for the duration of a pulse from the pulse train 709.

Attention is now drawn to the area of FIG. 20 labeled "TYPICAL GEN.-BUS CONNECTION." In particular, attention is drawn to this typical generator-bus connection to illustrate what occurs whenever a transient drop is imposed on a system generator. As shown, a switch S12 has three positions which may be selected by operator control to be described hereinafter, for generator "in service" (IS), generator "out of service" (OS) and generator "transient drop" (TD). Accordingly, whenever the switch S12 is in position "TD" through operator control the transient drop pulse train 709 will be delivered over connector 727 to the associated previously described generator faulting device to cause the generator to be disconnected from its associated bus for the duration of a pulse from the train 709. It will be appreciated that in actuality a transient drop only occurs once in a given time period, but for the purpose of studying the swing angles of other generators, as referenced to the aforementioned infinite bus voltage angles, the transient drop is repeated with successive pulses for the duration of the transient drop pulse train. Further, this type of simulation also applies with respect to three phase faults and is labeled "Rep Op" for repeated operation. The "OS" position of the generator will be more permanently disconnected from its associated bus.

Also shown is a resistor $R_d$, which is a damping resistor corresponding to resistor R2 of FIG. 19, which resistor $R_d$ is connected across the generator whenever the damp pulse train is delivered. As was stated previously, the damping effect is employed to return the generator to system initial conditions whenever zero generator electrical power is experienced.

Attention is now drawn to the area of FIG. 20 labeled "TYPICAL LOAD-BUS CONNECTION." In particular, attention is drawn to this typical load-bus connection to illustrate what occurs whenever a transient drop is imposed at a system load, i.e., a transient load disconnect is imposed. As shown, a switch S14 has three positions selected under operator control to be described hereinafter, including load "in service" (IS), load "out of service" (OS) and load "transient drop" (TD). Accordingly, whenever the switch S14 is in position "TD" the transient pulse train 709 is delivered over connector 728 to the associated load faulting device causing the load to be disconnected from its associated bus for the duration of the pulse from train 709. Whenever the switch S14 is in the "OS" position the load is disconnected from its associated bus more permanently.

Figure 21A:
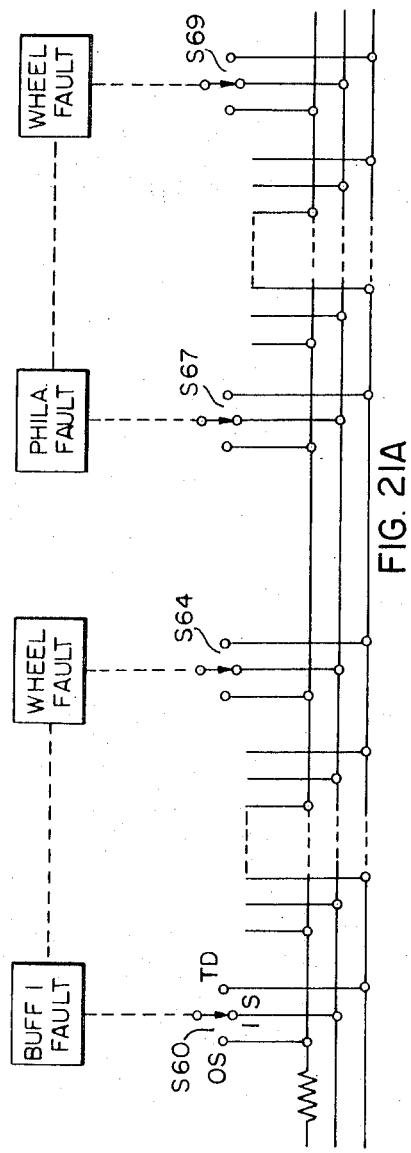
FIG. 21A shows a schematic wiring diagram and switch arrangement for connecting fault signals to the generators of the system shown in FIG. 1.
Figure 21B:
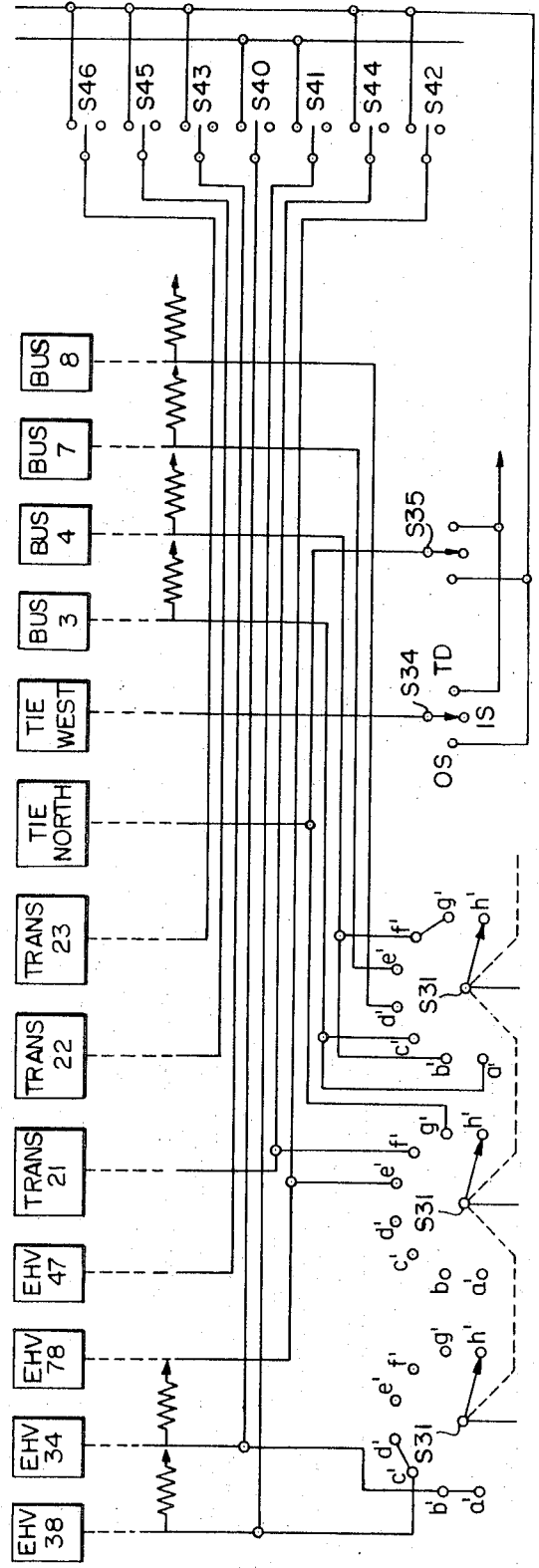
FIG. 21B shows a schematic wiring diagram and switch arrangement for connecting fault signals to lines, tie lines, and buses of the system shown in FIG. 1.

Reference is now made to FIG. 21 which sets forth a preferred wiring diagram for establishment of bus and line three phase faults and generator and load transient drops for the electric power system of FIG. 1. The diagram shown in FIG. 21 is employed with respect to an operator control function. Digital control may be employed through computer contact closure outputs operated under software control to be described hereinafter. With regard to the establishment of bus and line three phase faults a three deck switch S31 having eight positions is employed. The path established by the switch S31 is from a D.C. excitation through switch S31 to the appropriate driving circuitry associated with the signal generator 702 of FIG. 20 for either field effect transistors or relays whichever the case may be. As will be appreciated from viewing FIG. 21, when the switch S31 is in position a' a three phase fault at line 34 (FIG. 1) and bus 3 (FIG. 1) will be actuated. When switch S31 is in position b' a three phase fault at line 34 and bus 4 will be actuated. When switch S31 is in position c' a three phase fault at line 38 and bus 3 will be actuated. When switch S31 is in position h' no three phase fault is actuated.

Switches S34 and S35 each have three positions for respectively establishing tie lines "WEST" and "NORTH" "in service" (IS), "out of service" (OS) or under a "transient drop" (TD) condition. Switches S40, S41, S42, S43, S44, S45 and S46 each have two positions for respectively establishing lines 34, 38, 78, 47, and transformers 21, 22 and 23 "in service" (IS) or "out of service" (OS). It will be recalled that line "OS" signals override line three phase fault signals.

With regard to the establishment of generator and load transient drop conditions, switches S60 . . . S64 are employed for generator transient drops and switches S67 . . . S69 are employed for load transient drops. Each of these switches has three positions for establishing generators or loads "in service" (IS), "out of service" (OS) or under a "transient drop" (TD) condition. Whenever a transient drop occurs, a path is established from a D.C. excitation through the switch to the driving circuits associated with the signal generator 702 of FIG. 20 for the field effect transistor which simulate generator or load transient drops.

CONTROL PANEL FOR LOADFLOW CALCULATOR HAVING TRANSIENT STABILITY ANALYSIS CAPABILITY

Reference is now made to FIG. 22 which depicts a control panel for operator control of the transient stability analyzer described hereinabove with view towards a training demonstrator with particularity directed toward the electric power system of FIG. 1. Shown at the top of the panel is a plurality of indication devices or meters for displaying and indicating generator electrical power in megawatts (800), bus voltage (801) megawatts and megavars delivered at one end of a line or a transformer (803, 804), load megawatts and megavars (806, 807), and generator swing angles (810, 811, 812, 813, 814).

A switch S70, which is a three-pole, 10 position switch implements selection for display of generator electrical power and bus voltage magnitude as shown in FIG. 23A. In FIG. 23A, the positioning of switch S70 connects appropriate real and imaginary bus voltage signals, $E^r$ and $E^i$, as inputs to a voltage magnitude generating circuit 920. The circuit 920 provides an output signal E , which is the square root of the sum of the squares of the input signals $E^r$ and $E^i$, to the meter 801 on the control panel of FIG. 22. The same positioning of switch S70 also connects the appropriate generator electrical power signal to the meter 800 of the control panel of FIG. 22.

A switch S71, which is a four-pole, 12 position switch implements selection for display of the real and reactive powers, $P_{line}$ and $Q_{line}$, at one end of a particular line or transformer as shown in FIG. 23B. In FIG. 23B, the positioning of switch S71 connects appropriate real and imaginary bus voltage signals, $E^r$ and $E^i$, and real and imaginery line current signals, $I^r$ and $I^i$, as inputs to a line power calculating circuit 921. The circuit 921 provides through multiplication and summing operations output signals of line real power, $E^r I^r + E^i I^i$ or $P_{line}$, to meter 803 of the control panel of FIG. 22, and line reactive power $-E^r I^i + E^i I^r$, or $Q_{line}$, to meter 804 of the control panel of FIG. 22.

A switch S74, which is a four-pole, four position switch implements selection for display of load real and reactive powers, $P_{load}$ and $Q_{load}$ as shown in FIG. 23A. In FIG. 23A, the positioning of switch S74 connects appropriate real and imaginary bus voltage signals, $E^r$ and $E^i$ and real and imaginary load current signals, $I_1^R$ and $I_1^I$, to a load power calculating circuit 922. The circuit 922 provides power, multiplication and summing operations output signals of load real power, $E^r I_1^R + E^i I_1^I$, or $P_{load}$, to meter 806 of the control panel of FIG. 22, and load reactive power, $-E^r I_1^I + E^i I_1^R$, or $Q_{load}$, to meter 807 of the control panel of FIG. 22.

Figure 22A:
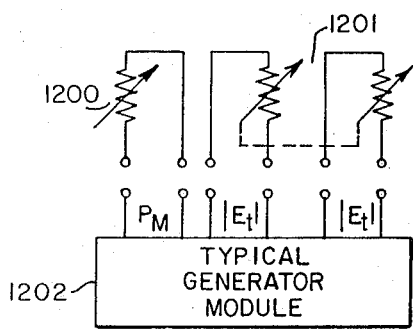
FIG. 22 illustrates a control panel for the performance of switching functions, power and voltage setting, load admittance settings, etc., on the analog portion of the hybrid arrangement of FIG. 10.

Returning to FIG. 22, switches S101 through S105 provide for adjustment through potentiometers of generator mechanical powers, $P_m$, which are input to the generator models representative of the generator of the electric power system of FIG. 1. Switches S201 through S205 provide for adjustment through potentiometers of generator terminal voltage magnitudes, $E_t$. Switches S301 through S305 are generator "in service" (ON), "out of service" (OFF) and "transient drop" (TD) switches corresponding to switches S60 . . . S64 of FIG. 21. These potentiometer connections are more specifically shown in FIG. 22A. Shown in FIG. 22A are a generator mechanical power potentiometer 1200 and a ganged generator voltage magnitude potentiometer 1201 (ganged because of two components of voltage) connected to the generator module 1202. These potentiometer settings are shown as circuit inputs $P_m$ and $E_t$ in the generator circuit of FIG. 19.

In the line and transformer section of the panel, switches S401, S402, S403 and S404 corresponding to switches S40, S41, S43 and S42 of FIG. 21 provide for line "in service" (ON) and "out of service" (OFF) for transmission lines 34, 38, 47 and 78 in the electric power system of FIG. 1. Switches S405, S406 and S407, corresponding to switches S46, S45 and S44 of FIG. 21, provide for transformer "in service" (ON) and "out of service" (OFF) for transformers 23, 22 and 21 of the electric power system of FIG. 1.

Switches S408 and S409, corresponding to switches S35 and S34 of FIG. 21, provide for tie line "in service" (ON), "out of service" (OFF) and "transient drop" (TD) for tie lines "NORTH" and "WEST" in the electric power system of FIG. 1. Switch S501 corresponds to switch 710 of FIG. 20 and places the electric power system of FIG. 1 either under steady state or transient condition. Switch S502 is a control scaling switch for a cathode ray tube (not shown) having at least four channels for display of generator swing angle curves.

Switch S602 controls a potentiometer corresponding to potentiometer P11 of FIG. 20 for variation of the previously described fault duration time. Switch S603 corresponds to switch 701 of FIG. 20 and provides for analyzer operation at real time, 10 times faster than real time and 50 times faster than real time. Switch S601 is a three deck switch corresponding to switch S31 of FIG. 21 for selection of line, bus three phase faults.

Turning now to the load section of the control panel, switches S701 through S703, corresponding to switches S67 . . . S69 of FIG. 21 provide for load "in service" (ON), "out of service" (OFF) and "transient drop" (TD) for loads 25, 26 and 28 in the electric power system of FIG. 1. Switches S901 and S902, S903 and S904, and S905 and S906 are potentiometers which respectively provide for adjustment through operator control of load admittance to attain a system steady state solution.

Figure 22B:
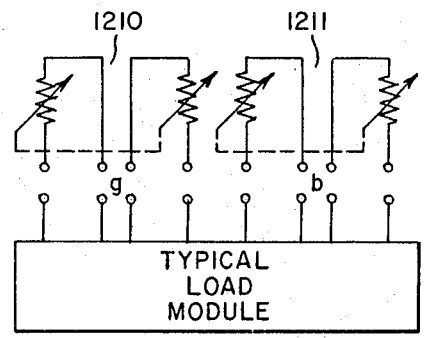

The load admittance potentiometers are more specifically shown in FIG. 22B. There are two ganged potentiometers per load (in accordance with load circuitry of FIGS. 6, 17A, 17B and 17C) 1210 and 1211, respectively for representation of load conductance and susceptance values.

HYBRID TRANSIENT ANALYZER WITH UNIVERSAL INTERFACING CAPABILITY

Figure 24:
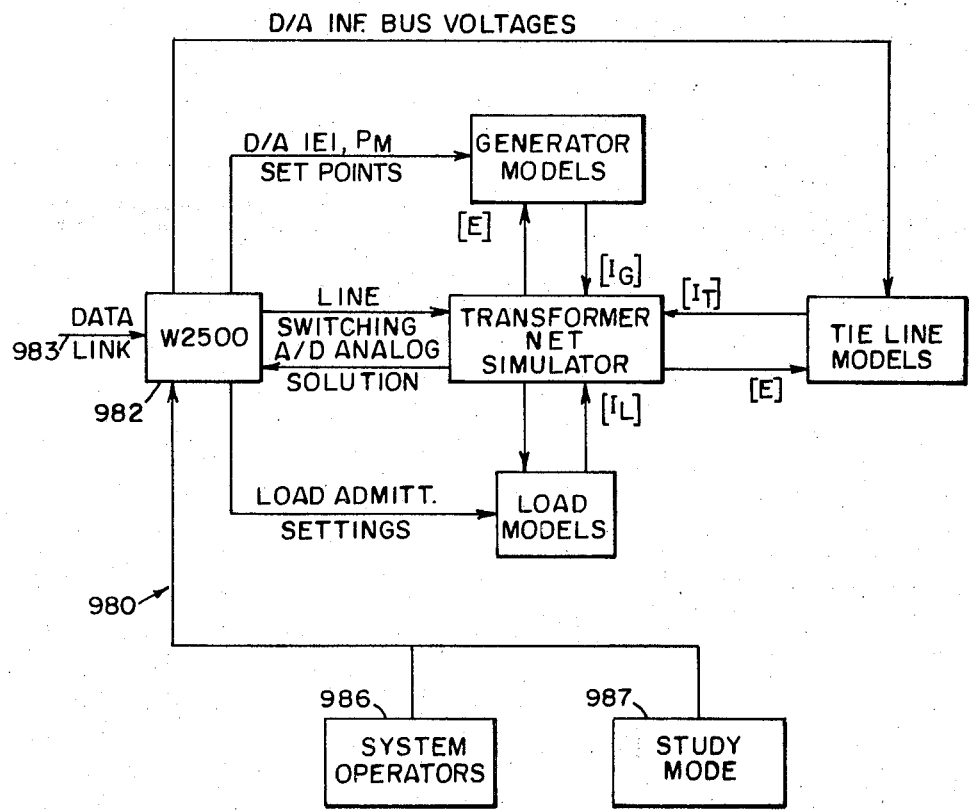
FIG. 24 shows a block diagram of a hybrid load flow computer arrangement having transient stability analysis capability with universal interfacing through a data link.

Reference is now made to FIG. 24 which depicts a hybrid transient analyzer 980, including the above described load flow calculator with transient analysis capability, for power system applications on line under operator request and for study cases. The embodiment shown is useful for training studies and for on line analysis. Shown in FIG. 24, is a variation of the configuration of FIG. 10, including the analog portion of FIG. 10 interfaced with a digital computer 982 for controlling the analog section and monitoring analog results. The computer 982 is preferably of the Westinghouse W—2500 or P2000 type and can receive input power system data acquired on-line by a larger digital computer machine through a data link 983. On-line data includes actual tie and load powers, generator powers and controlled voltage magnitudes and equipment out of service. The configuration is also capable of free-standing operation in which case input data is entered on cards, paper tape or magnetic tape. The input data acquired and stored by the computer 982 consists of load powers, generator powers and voltage magnitudes and tie line powers.

Reference is made to Appendix B for a description of the functions of the data link 983. Reference is further made to the "P—2000 Monitor Reference Manual" TP043 and monitor listing as made publicly available in Murrysville Public Library, Carson Street, Murrysville, Pa.

On receipt of new data over the data link 983, the computer 982 converges the analog section which models by one to one correspondence an actual power system, to a steady state solution representative of the actual power system loadflow, which serves as the initial state for transient condition studies. Convergence to steady state is preferably accomplished by steering load admittance values and tie external bus voltage values under control of the computer 982. Steady state convergence is iterative, with the computer 982 checking power flows against input data including specified tie power and load power constraints discussed more fully hereafter, at the end of each iteration. After steering the analog section to the steady state, the computer 982 imposes transient conditions on the analog analyzer as subsequently considered more fully herein. During transient solution, which is executed by the analog section above, the computer 982 scans and stores solution values. After solution, the computer 982 monitors solution values for instability by observing general swing angle and rotational velocity behavior during transient conditions.

The analyzer 980 will also operate in two additional modes: operator request and study case, as indicated by blocks 986 and 987 of FIG. 24. The blocks 986 and 987 are interfaced with the computer 982 and may be pushbuttons on an operator's console for requesting desired information.

In the operator's request mode, transient cases may be requested which are initialized at steady state conditions other than that which results from the most current set of on-line data over data link 983. By means of operator request pushbuttons (not shown) an operator may specify: (1) any desired changes to on-line data presently stored in the computer 982; (2) the transient condition including three phase faults transient drops and out of service conditions for analysis: (3) transient generator swing angles for display.

In the study mode, card-entered information will furnish the input data normally supplied over data link 983. As in the operator request mode, there exists the option to change input data after it is read and stored by the computer 982. In the study mode, the user not only specifies the transient condition and swing angles for display, but also the fault clearing time and the reclosure time in the event of a line fault.

LOADFLOW FLOW CHART EMPLOYED FOR HYBRID LOAD FLOW ARRANGEMENT HAVING TRANSIENT STABILITY ANALYSIS CAPABILITY - CONVERGENCE OF THE LOAD FLOW SOLUTION

As was previously mentioned, for transient stability analysis, an iterative process is employed in the analyzers of FIG. 24 and FIG. 10 for converging the system load flow solution in accordance with system tie line power and system load power constraints. It will be noted that a method for converging a load flow solution is set forth in copending application Ser. No. 175,289. However, that method is not specifically for use in the present invention because generators, loads and ties are not represented by analog modules there. Accordingly, reference is now made to FIGS. 25A, 25B and 25C which set forth a preferred flow chart employed for convergence of the load flow solution in such systems as described herein. In conjunction with the chart of FIGS. 25A, 25B and 25C the following information is set forth for the purpose of better understanding the chart. For each of four categories of system components, i.e., buses, generators, loads and tie lines is associated a maximum number and an index as shown in the table below:

| CATEGORY | MAXIMUM NUMBER | INDEX |
|---|---|---|
| Bus | NB | I |
| Generator | NG | J |
| Load | NL | L |
| Tie Line | NT | K |

As will be appreciated, "NB" represents the maximum number of buses with "I" being the associated bus index, "NG" represents the maximum number of generators with "J" being the associated generator index, "NL" represents the maximum number of loads with "L" being the associated load index, and "NT" represents the maximum number of tie lines with "K" being the associated tie line index. The maximum numbers NB, NG, NL and NT are determined by total numbers of buses, generators, loads and ties in the actual system based on a one-to-one correspondence.

Variables delivered from the digital computer of the hybrid arrangement to the analog simulator through an I/O interface in per unit values are generator real power PSP(J) and voltage magnitude VSP(J), load admittance settings for load conductance G(L) and load susceptance B(L), and real and imaginary components of external tie bus voltages ETIER(K) and ETIE(K). The analog simulator models a predetermined power system with connections as represented by a common place one line diagram. Digitally provided data pertains to the predetermined system. Variables delivered from the analog simulator of the hybrid arrangement to the digital computer in per unit value are the real and imaginary tie current responses, ITIER(K) and ITIEI(K), real and imaginary load current responses, ILOADR(L) and ILOADI(L), and real and imaginary load-bus voltage responses, ELOADR(L) and ELOADI(L).

Figure 25A:
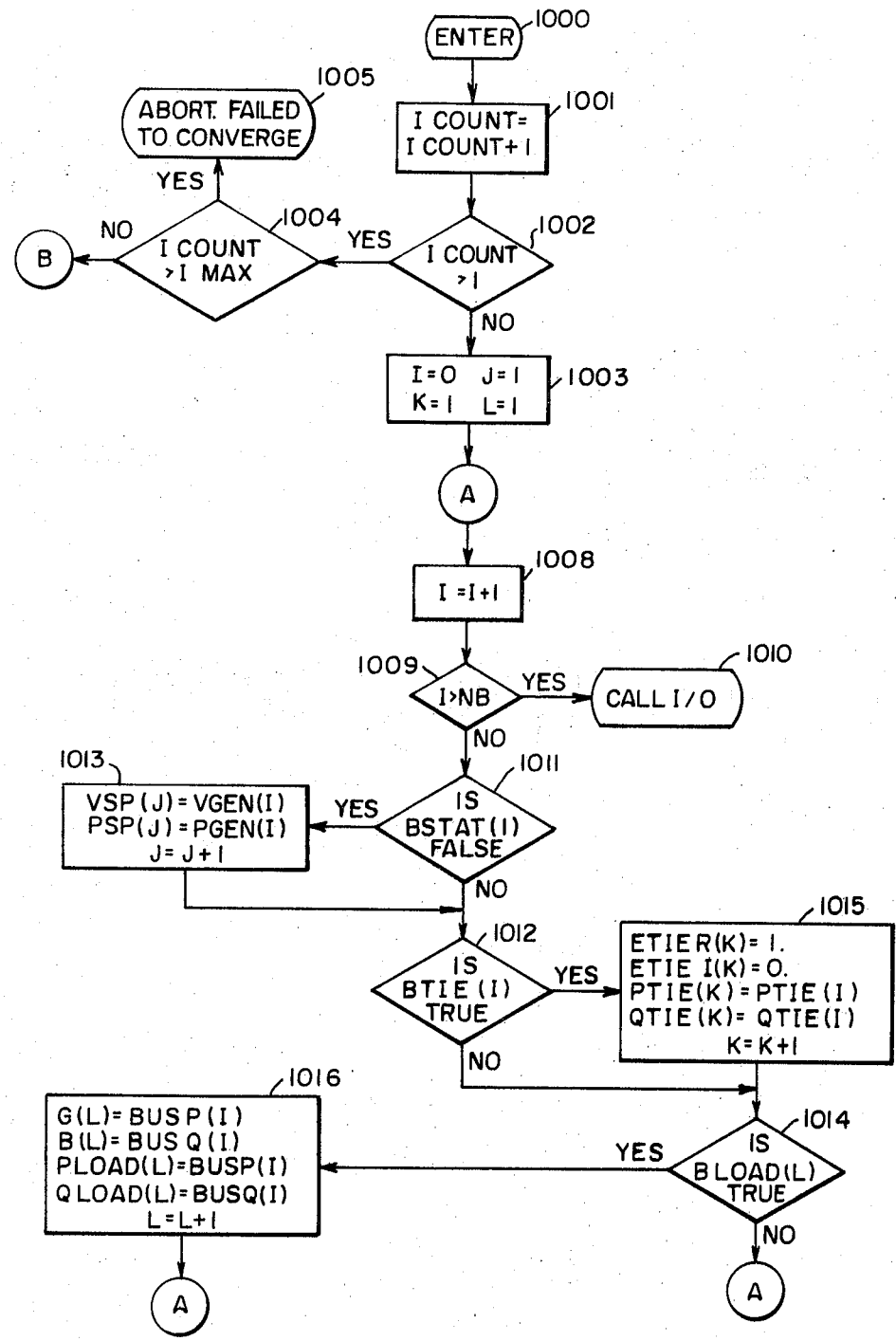
FIGS. 25A through 25C set forth a flow chart employed for converging the load flow solution in the digital computer of the hybrid arrangement in FIG. 10.
Figure 25:
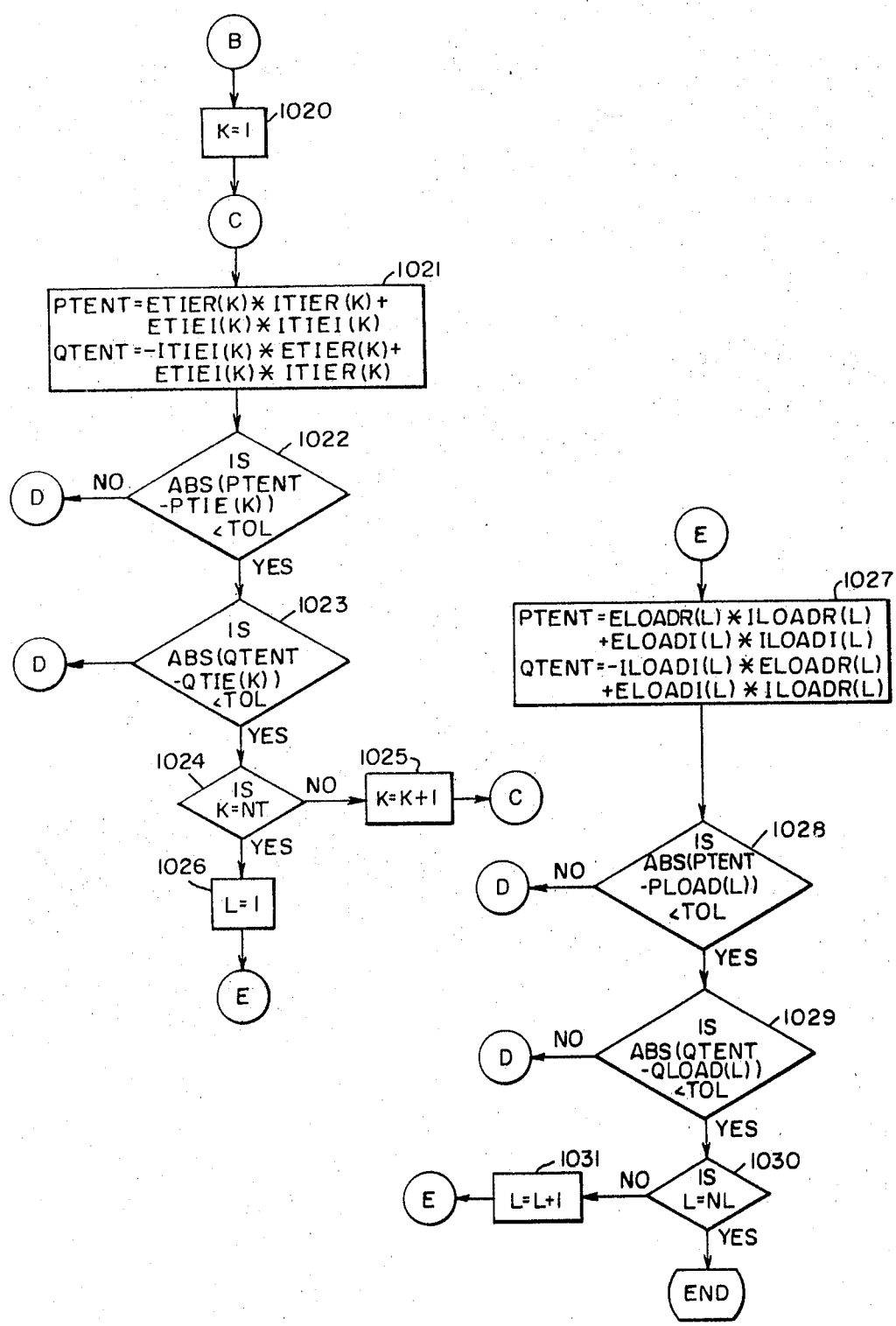

Data arrays associated with the flow charts of FIGS. 25, 25A and 25B are shown below as follows:

| PTIE | QTIE | BUSP (1) (2) | BUSQ | PGEN | VGEN | BSTAT | BTIE | BLOAD |
|---|---|---|---|---|---|---|---|---|
| (NB) | (NB) | (NB) | (NB) | (NB) | (NB) | (NB) | (NB) | (NB) |
| | | LOAD DATA | | | | LOGICAL | | |

As will be appreciated, PTIE and QTIE are real and reactive tie power data for each bus up to NB buses. Zero values will appear in these arrays for buses not connected to tie lines. BUSP and BUSQ are load admittance data as well as load real and reactive power data for each bus up to NB busses; zero values will appear in these arrays for buses not connected to loads. PGEN and VGEN are generator real power and voltage magnitude data for each bus up to NB buses; zero values will appear in these arrays for buses which are not voltage regulated buses, i.e., not connected to generators.

The arrays BSTAT, BTIE and BLOAD are logical arrays having values of either "false" or "true" for each bus up to NB buses. They respectively represent the absence or presence of a generator, a tie line or a load connected to a particular bus.

Figure 25C:
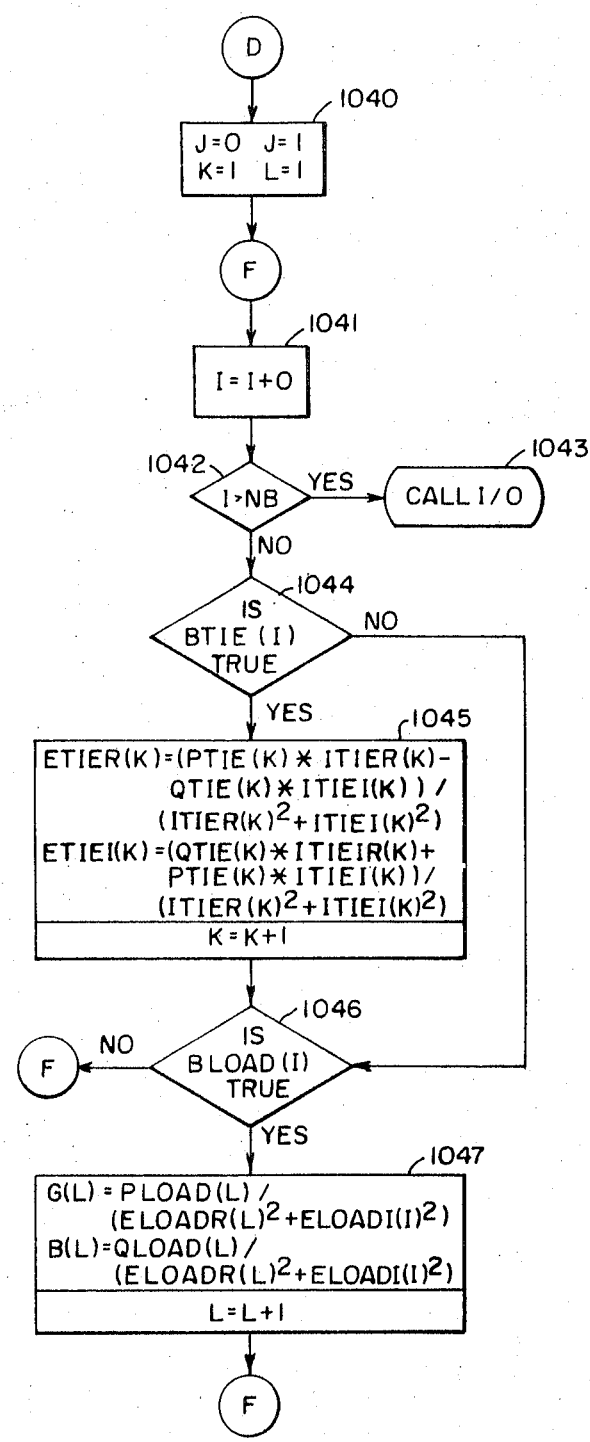

Focusing attention specifically to FIGS. 25A 25B and 25C an "ENTER" block 1000 begins the load flow program by calling the initial loadflow data arrays with a counting variable ICOUNT initially set to be zero. The block 1000 feeds into block 1001 which sets the counting variable ICOUNT equal to (ICOUNT + 1). The block 1001 feeds into a decision block 1002 which asks whether the counting variable ICOUNT is greater than "1." If the answer is "yes," then block 1002 feeds into block 1004 to be discussed hereinafter. If the answer is "no," then block 1002 feeds into block 1003 for initializing operations for the upcoming calculation.

The block 1003 sets indices I, J, K and L equal to "0," "1," "1" and "1," respectively. The block 1003 then feeds to a program point "A." The program point "A" determines whether or not each bus is a voltage regulated, a load connected and/or a tie line connected bus. In accordance with these determinations values are assigned to generator real power and voltage magnitude, load admittance, external tie bus voltage and tie line power variables associated with each system bus.

Under program point "A" the index I is set to equal its present value plus one (1) by block 1008. The block 1008 then feeds to decision block 1009 which asks whether the value of index I is greater than "NB," the total number of buses in the actual power system. If the answer is "yes" then the load data with ICOUNT equal to its current value is called as indicated by the "CALL I/O" block 1010 and entered at the block 1000. If index I is not greater than the total number of buses, NB, block 1009 feeds to decision block 1011 which asks whether the logical function BSTAT(I) is false, i.e., whether bus (I) is connected to a generator and is voltage regulated. If BSTAT(I) is not false, the block 1011 feeds to decision block 1012. If BSTAT(I) is false, i.e., if bus (I) is a voltage regulated bus, the block 1011 feeds to block 1013 which sets variables VSP(J) and PSP(J), respectively representative of generator voltage magnitude and real power, equal to the data array values VGEN(I) and PGEN(I). The block 1013 also increases the present value of index J by one (1) and feeds to decision block 1012.

The block 1012 asks whether BTIE(I) is true, i.e., whether bus (I) is connected to a tie line. If the answer is "no," then block 1012 feeds decision block 1014. If the answer is "yes" then block 1012 feeds block 1015. The block 1015 sets variables ETIER(K) and ETIEI(K), respectively representative of real and imaginary components of tie bus voltage for the tie lines connected to bus (I), equal to per unit values of "1." and "0.." The block 1015 also sets variables PTIE(K) and QTIE(K), respectively representative of tie line real and reactive powers, equal to data array values PTIE(I) and QTIE(I), and the block 1015 also increases the current value of the index K by one (1), then feeding to decision block 1014.

The decision block 1014 asks whether BLOAD(L) is true, i.e., whether bus (I) is connected to a load. If the answer is "no," then the program point "A" is carried out for the bus (I + 1). If the answer is "yes," then the block 1014 feeds to block 1016 which sets variables G(L) and B(L), respectively representative of load conductance and susceptance, equal to data array values, BUSP(I) and BUSQ(I). The block 1016 also sets variables PLOAD(L) and QLOAD(L), respectively representative of load real and reactive power, equal to data array variables BUSP(I) and BUSQ(I), and, the block 1016 also increases the current value of the index L by one (1) then feeding back to program point "A," which is carried out for bus (I + 1).

Returning now to decision block 1002, if counting variable ICOUNT is greater than "1," then block 1002 feeds decision block 1004, which asks whether the counting variable ICOUNT is greater then IMAX, a preselected maximum iteration count. If the answer is "yes" then the program is aborted for failure to converge as indicated by block 1005. If the answer is "no," then a program point "B" is called.

The program point "B" sets the value of the index K to one (1) once again as indicated by block 1020. The block 1020 then feeds to program point "C." The program point "C" is a checking subroutine for determining whether or not tie line real and reactive powers are within predetermined constraints. The block 1021 sets variable PTENT, representative of a tentative real tie line power, equal to the sum of the products of ETIER(K) and (ITIER(K) and the product of ETIEI(K) and ITIEI(K). The block 1021 also sets variable QTENT, representative of a tentative reactive tie line power, equal to the sum of the product of ITIEI(K) and ETIER(K) and the product of ETIEI(K) and ITIER(K). The block 1021 feeds a decision block 1022 which asks whether the absolute value of the difference between the tentative real tie line power PTENT and the data array real tie line power PTIE(K), is less than a predetermined tolerance, TOL, which is typically 0.001 to 0.01 per unit (1 per unit equals 100 MW). If the answer is "no," then program point "D," to be described hereinafter, is called. If the answer is "yes," then block 1022 feeds to decision block 1023 which asks whether the absolute value of the difference between the tentative reactive tie line power, QTENT, and the data array reactive tie line power, QTIE(K), is less than the predetermined tolerance, TOL. If the answer is "no," then program point "D" is called. If the answer is "yes," block 1023 feeds a decision block 1024, which asks whether the index K is equal to the maximum number of tie lines "NT." If the answer is "no," the block 1024 feeds the block 1025 which increases the current value of the tie line index by one (1) and returns to subroutine "C" for the next tie line (K + 1). If the answer is "yes," the block 1024 feeds block 1026 which sets the load index L equal to one (1) and calls a program point "E."

The program point "E" is a checking point for determining whether or not real and reactive load powers are within predetermined constraints. As shown, the block 1027 sets variable, PTENT, representative of a tentative value of load real power, equal to the sum of the product of ELOADR(L) and ILOADR(L) and the product of ELOADI(L) and ILOADI(L). The block 1027 also sets variable QTENT, representative of a tentative value of load reactive power, equal to the sum of the product of ILOADI(L) and ELOADR(L) and the product of ELOADI(L) and ILOADR(L).

The block 1027 feeds a decision block 1028 which asks whether or not the absolute value of the difference between the tentative real load power, PTENT, and the data array real load power is less than tolerance, TOL. If the answer is "no," then program point "D" is called. If the answer is "yes," then the block 1028 feeds a decision block 1029, which asks whether or not the absolute value of the difference between tentative load reactive power, QTENT, and data array load reactive power is less than the tolerance, TOL. If the answer is "no," then program point "D" is called. If the answer is "yes," block 1029 feeds decision block 1030, which asks whether the load index L, equals the maximum number of loads, "NL." If the answer is "yes," the load flow solution has converged and the program is ended. If the answer is "no," then the load index L is increased by one (1) and program point "E" is executed for load (L + 1).

Program point "D" sets the four previously described indices, I, J, K and L to values of "0," "1," "1" and "1," respectively, as indicated by block 1040. Block 1040 then feeds to program point "F" which recalculates real and imaginary components of tie bus voltage, as well as load conductance and susceptance. As shown, the block 1041 increases bus index I by one (1) and feeds to decision block 1042. The block 1042 asks whether index I is greater than the maximum number of buses "NB." If the answer is "yes," the load flow is once again called, as indicated by block 1043, with counting variable ICOUNT at its present value at the "ENTER" block 1000. If the answer is "no," then block 1042 feeds to decision block 1044, which asks whether logical function BTIE(I) is true, i.e., whether bus (I) is connected to a tie line for recalculation of real and imaginary components of the bus voltage. If the answer is "no," block 1044 feeds to decision block 1046. If the answer is "yes," block 1044 feeds to block 1045.

Block 1045 sets the real component of tie bus voltage ETIER(K) equal to the value: (PTIE(K)*ITIER(K) − QTIE(K)*ITIEI(K)/(ITIER(K)$^2$ + ITIEI(K)$^2$). Block 1045 also sets the imaginary component of tie bus voltage, ETIEI(K), equal to the value: (QTIE(K)*ITIER(K) + PTIE(K)*ITIEI(K)) /(ITIER(K)$^2$ + ITIEI(K)$^2$). And block 1045 increases the tie line index K by one (1), then feeding to decision block 1046.

Decision block 1046 asks whether the logical function BLOAD(I) is true, i.e., whether bus (I) is connected to a load. If the answer is "no," then block 1046 returns to program point "F" for recalculations with respect to bus (I + 1). If the answer is "yes," block 1046 feeds to block 1047 for recalculation of load conductance and susceptance. Block 1047 sets load conductance, G(L) equal to the value PLOAD(L) /(ELOADR(L)$^2$+ELOADI(L)$^2$). Block 1047 also sets load susceptance, B(L), equal to the value QLOAD(L) /ELOADR(L)$^2$+ELOADI(L)$^2$. And, block 1047 increases the load index L by one (1), then returning to program point "F" for recalculations with respect to bus (I + 1). As will be appreciated, the entire iterative process of FIGS. 25A and 25B is carried out until the load flow solution converges, or until it is aborted for failure to converge.

FLOW CHART FOR TRANSIENT STABILITY MONITORING OF AN ELECTRIC POWER SYSTEM

Figure 26:
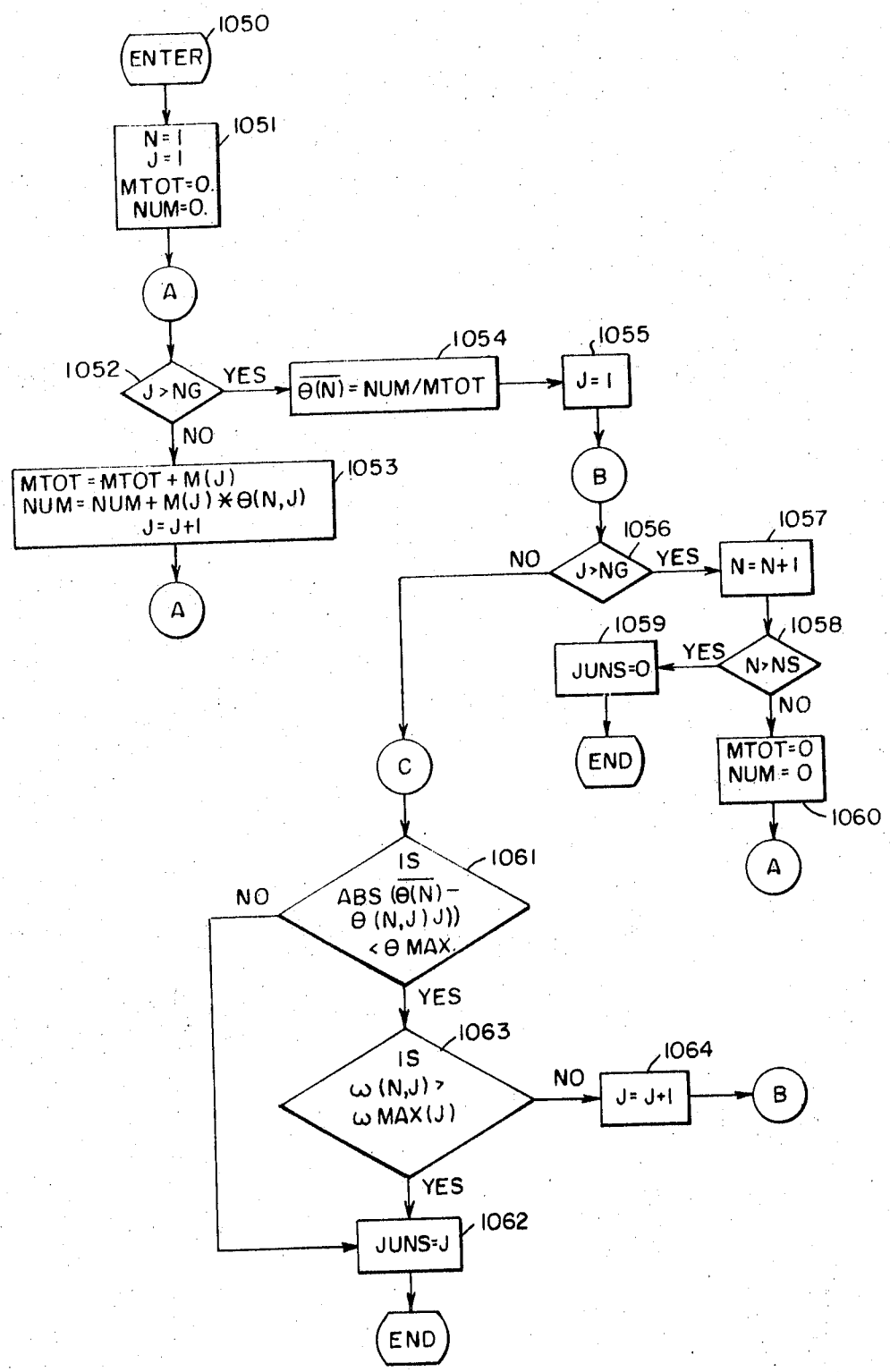
FIG. 26 shows a flow chart for transient stability monitoring by the digital computer of the hybrid arrangement in FIG. 10.

Once the load flow solution for the electric power system has converged, it is desirable to monitor the system upon the imposition of transient conditions on the analog simulator by the computer. For security monitoring purposes the generator swing angles and rotor angular velocities are read from the analog simulator into the digital machine through analog-to-digital converter circuitry and scanned to determine system stability under the imposed transient conditions. Reference is made, therefore, to FIG. 26 which depicts a flow chart diagram for monitoring the electric power system transient conditions as simulated by the analog simulator in response to computer imposed conditions through an addressing of an interfacing controller (not shown). In connection with FIG. 26, the following information is set forth:

N = scan index;
NS = total number of scans to be made;
J = generator index;
NG = total number of system generators;
MTOT = total rotational inertia of the power system in per unit value;
M(J) = rotational inertia of generator (J).

As shown in FIG. 26, the program is commenced by "ENTER" block 1050. The enter block 1050 feeds to block 1051 which sets the scan index N equal to one (1), the generator index J equal to one (1), the total rotational inertia MTOT equal to "0.," and a variable NUM equal to "0.." The block 1051 feeds to program point "A" containing a decision block 1052, which asks whether the generator index J is greater than the total number of system generators, "NG." If the answer is "no," then block 1052 feeds to block 1053. The block 1053 sets the variable MTOT equal to its current value plus M(J) (the rotational inertia of generator (J)). The block 1053 also sets the variable NUM equal to its current value plus the product of the rotational inertia of generator (J), M(J), and the generator (J) swing angle value at scan N, $\theta(N,J)$. And the block 1053 increases the generator index, J, by one (1), then returning to program point "A" for calculations with respect to generator (J + 1). If the answer from decisional block 1052 is "yes," i.e., if generator index J is greater than the total number of system generators, "NG," then block 1052 feeds to block 1054. Block 1054 sets a variable $\theta(N)$ equal to the quotient of the variable NUM and the total system rotational inertia MTOT. Block 1054 then feeds block 1055 which sets the generator index J, equal to "1" and calls a program point "B."

Program point "B" contains a decision block 1056 which asks whether the generator index J, is greater than the total number of generators in the system "NG." If the answer is "no," then block 1056 calls a program point "C," to be more fully described hereinafter. If the answer is "yes," the block 1056 feeds a block 1057 which increases the scan index N, by one (1) and feeds a decision block 1058.

The decision block 1058 asks whether the scan index N, is greater than the total of number of scans to be made. If the answer is "yes," then the block 1058 feeds a block 1059, which sets a variable JUNS equal to "0," indicating that the power system has remained stable for "NS" scans. The program is then ended. If the answer is "no," then block 1058 feeds a block 1060, which sets variables MTOT and NUM equal to "0." and returns to program point "A" for the next scan.

The previously mentioned program point "C" in FIG. 26 is a checking point for determining whether or not the variable $\theta(N)$ and a generator rotational velocity variable W(N,J) are within predetermined constraints. As shown, the program point "C" contains a decision block 1061, which asks whether the absolute value of the difference between the variable $\theta(N)$ and the swing angle $\theta(N,J)$ is less than a tolerance, $\theta MAX$. If the answer is "no," the block 1061 feeds to a block 1062 which sets the variable, JUNS equal to "J," indicating that generator J has gone unstable and the program is ended. If the answer is "yes," then block 1061 feeds to a decision block 1063.

The decision block 1063 asks whether the rotational velocity of generator J at scan N is greater than a maximum rotational generator velocity for generator J, $\omega MAX(J)$. If the answer is "yes," then block 1063 feeds to block 1062 which indicates an unstable condition at generator J and the program is ended. If the answer is "no," then block 1063 feeds to a block 1064, which increases the generator index by one (1) and returns to program point "B" for the generator (J + 1).

Transient conditions may be displayed selectively through employment of a multiple channeled cathode ray tube, as one example, to display swing angle variations, angular velocity, etc. As another example, analog quantities may be periodically sampled under transient conditions and stored in digital memory for display on an alphanumeric CRT or a line printer.

LOADFLOW AND TRANSIENT FAULT SIGNALING INTERFACING IN A HYBRID LOADFLOW COMPUTER ARRANGEMENT HAVING TRANSIENT STABILITY ANALYSIS CAPABILITY

Figure 27:
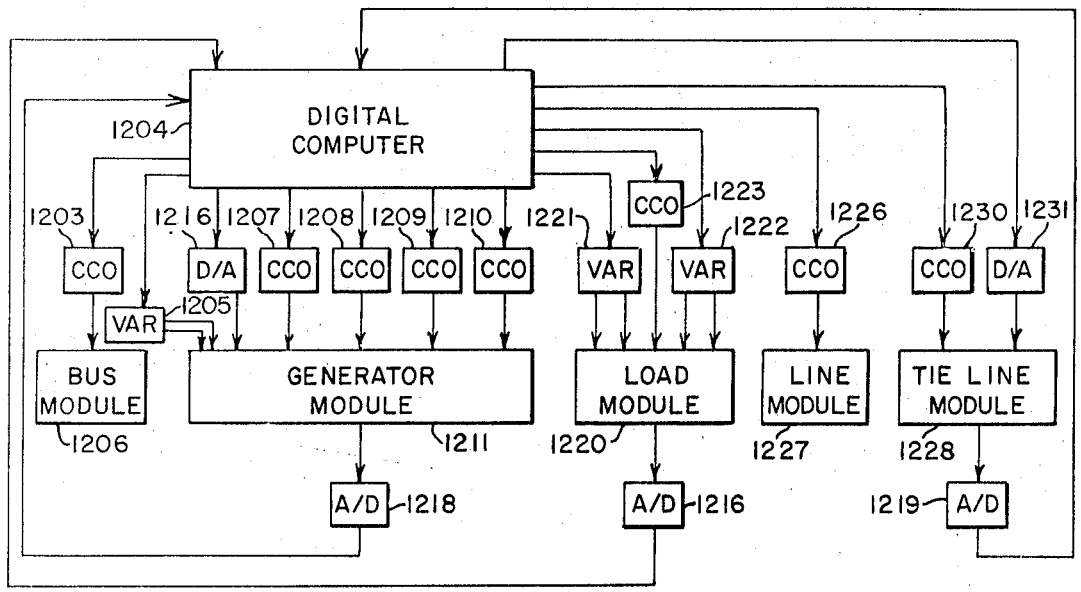
FIG. 27 shows an embodiment in which a digital computer is employed to impose inputs on an analog simulator.

Reference is now made to FIG. 27 which shows an illustrative schematic of digital-to-analog interfacing for digitally imposing system set points and transient faults on the analog modules hereinabove described with regard to transient stability analysis. It will be appreciated that the system shown is intended to replace the transient fault signaling circuitry of FIG. 20 when digital implementation of transient faults is desired. Shown in FIG. 27 is a digtial computer 1204, which may be of the Westinghouse P—2000 class, interfaced through typical digital-to-analog converter circuitry, contact closure output (CCO) circuitry and typical analog-to-digital converter circuitry to bus, generator, load, line and tie line modules of the transient stability analyzer described herein. Reference is made to copending application Ser. No. 250,826 entitled "A Digital Computer Monitoring And/Or Operated System Or Process Which Is Structured For Operation With An Improved Automatic Programming Process And System" and filed on May 5, 1972. Therein is set forth a contact closure output system employed in correlation with a Westinghouse P—2000 computer of which the contact closure outputs of FIG. 27 herein may be a part.

As shown in FIG. 27, the digital computer 1204 interfaces to each bus module 1206 through a single contact closure output 1203 for the imposition of a transient three phase fault at the bus. Four contact closure outputs 1207, 1208, 1209 and 1210 are employed for each generator module 1215. One is employed for imposition of a transient drop or out of service condition at the generator, one (shown as one, but actually two) is employed for increasing or decreasing system operation time (solution rate), i.e., real time or faster than real time, another is employed for the previously described restoration of the generator swing angle to zero, and the last is employed for the previously described generation damping. Also shown is digital-to-analog converter circuitry 1216 connected from the digital computer 1204 to the generator module 1211 for imposition of generator power constraints, a variable potentiometer 1205 for imposition of generator voltage magnitude constraints and analog-to-digital converter circuitry 1218 for providing generator swing angle and rotational velocity values to the digital computer 1204 for the previously described transient stability monitoring of the power system to be simulated.

As will be seen from viewing FIG. 27 interfacing between the digital computer 1204 and a load module 1220 is through a pair of variable potentiometer units, or digital coefficient units 1221 and 1222 for digital setting and variation of load conductance and susceptance values, respectively. A contact closure output 1223 also connects to the load module 1220 for imposition of a transient drop or out of service condition at the load. And analog-to-digital converter circuitry delivers load currents and voltages back to the digital machine.

A single contact closure output 1226 is provided to a representative line module 1227 for digital imposition of a fault relief condition by the operation of physically connected breakers at the ends of the associated line, a transient drop or an out-of-service condition at the line 1227. A representative tie line module 1228 is interfaced to the digital computer 1204 through a contact closure output 1230 for imposition of a fault relief condition by the operation of physically connected breakers at the ends of the associated tie line, a transient drop or out of service condition. Also shown is digital-to-analog converter circuitry 1231 for digital imposition of external tie voltage constraints at the tie line, and analog-to-digital converter circuitry 1219 for delivery of tie current values to the digital machine.

It will be appreciated that the contact closure outputs shown in FIG. 27 are connected to associated previously described field effect transistors included in the modular circuits. Preferably the opening of a contact closure output will cause its associated field effect transistor to conduct thereby causing corresponding grounding of amplifier outputs for transient or out of service conditions, addition of capacitances for variation of system operation time, generator swing angle restoration and generator damping.

Figure 28:
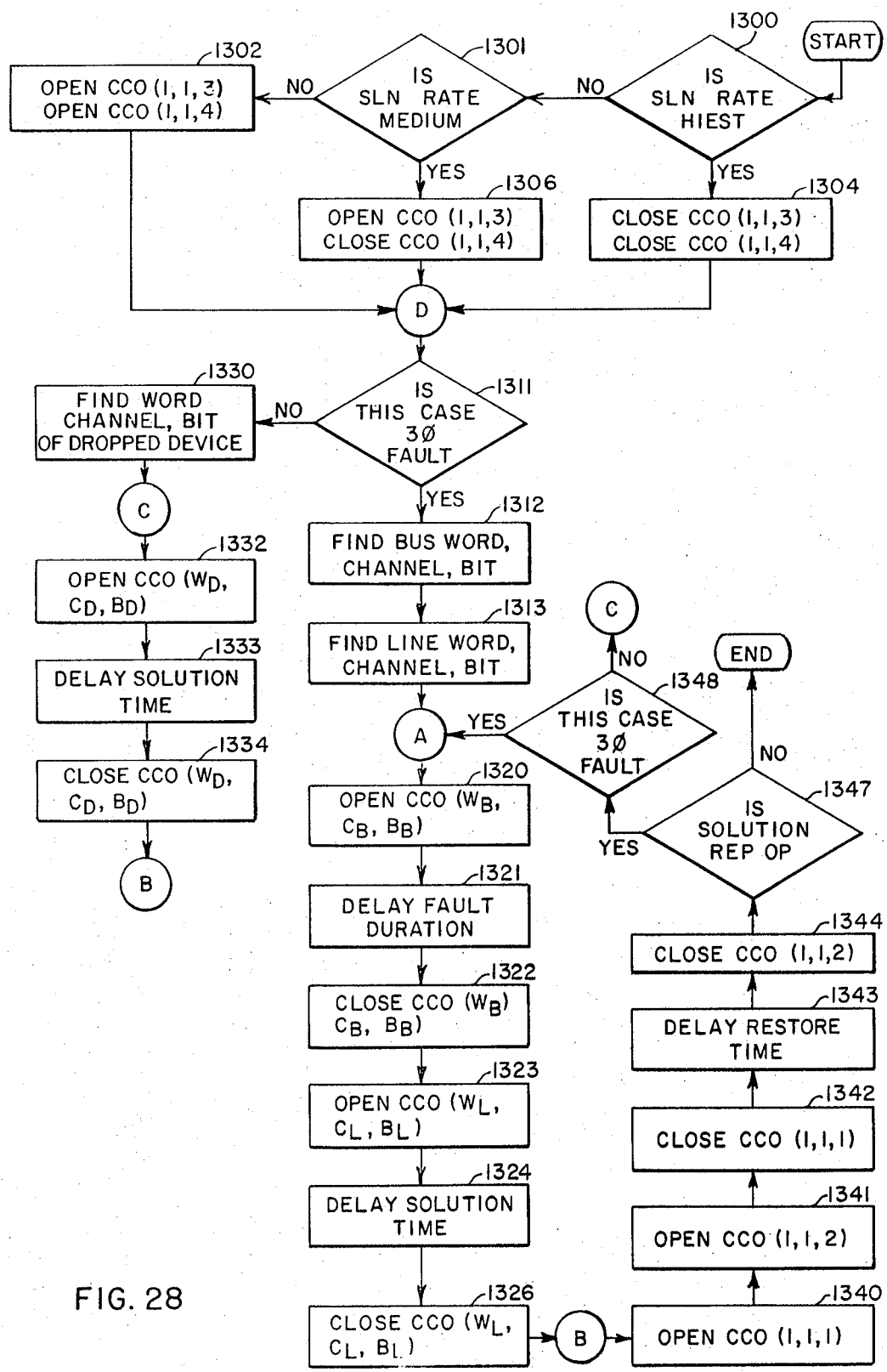
FIGS. 28 and 29 show flow charts for programs employed in the embodiment of FIG. 27.
Figure 29:
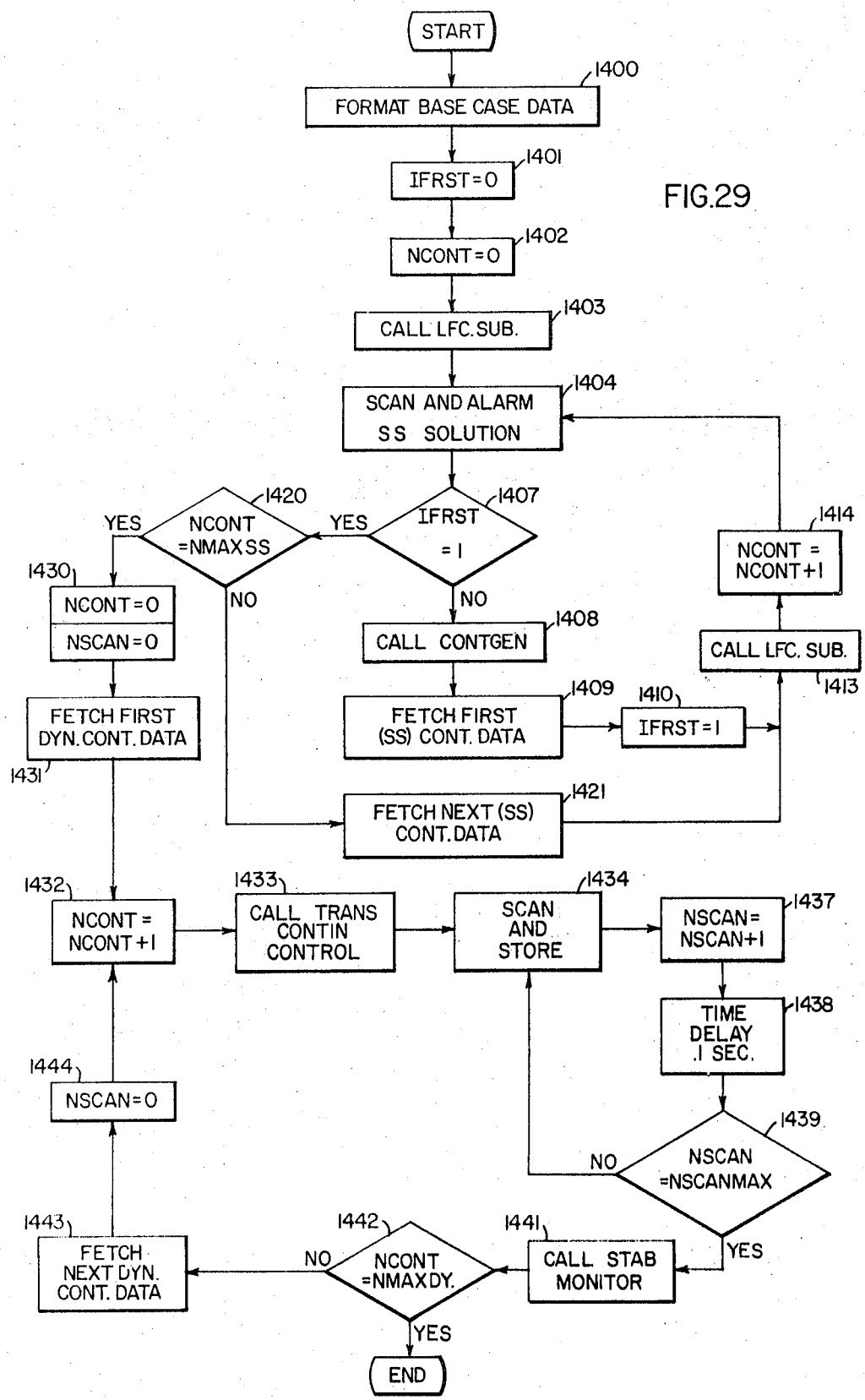

Reference is made to Appendix A for a description of the flow charts of FIGS. 28 and 29, respectively depicting methods of digital imposition of transient and out of service conditions, or transient contingency control, and a master control for digitally converging load-flow solutions, imposing transient or out of service conditions and monitoring transient results.

APPENDIX A

DIGITAL COMPUTER TRANSIENT CONTINGENCY CONTROL FLOW CHART FOR A HYBRID LOADFLOW COMPUTER ARRANGEMENT HAVING TRANSIENT STABILITY ANALYSIS CAPABILITY

In conjunction with the transient interfacing arrangement of FIG. 27, the following explanation concerns a flow chart setting forth a method for digitally applying transient contingencies including three phase faults and transient drops to the analog power system modules for transient stability analysis. By way of introduction several basics are set forth below to aid in the understanding of the transient contingency control flow chart of FIG. 28.

Accordingly, it will first be noted that each three phase fault condition has associated with it a six digital word pattern. The first word consists of a plurality of bits, one for setting and storing the presence or absence of a three phase fault condition, a predetermined number of other bits providing for setting and storing of three phase fault solution rate (the preselected rate at which the system operates; there are preferably three solution rates for real time and faster than real time), and a repeated operation ("Rep Op") bit for selecting and storing the previously described repeated fault condition.

The second word of the three phase fault word pattern is a multi-bit word indicating the system bus number, predetermined for each bus for the system to be modeled and studied, for the bus at which a three phase fault is imposed. Similarly, the third word of the three phase fault word pattern is a multi-bit word indicating the system line number for the line to be cleared whenever a three phase fault is imposed at one of its ends.

The fourth word of the three phase fault word pattern is a multi-bit word for selecting and storing a three phase fault solution time (the time duration it takes for imposition of a three phase fault at the preselected bus to restoration of the cleared associated line to service in the power system simulator). The fifth word of the three phase fault word pattern is a multi-bit word for selecting and storing a three phase fault restore time (the time for restoring the power system simulator to the initial condition which prevailed when the three phase fault was originally introduced). And finally, the sixth word of the three phase fault word pattern is for selecting and storing the fault duration time, or the amount of time between introduction of the three phase fault at the bus and the clearing of the associated line (at which time the faulted bus condition is relieved).

It will next be noted that for each transient drop condition at a generator, load, line or tie line that associated therewith is a four digital word pattern. The first word of this word pattern is similar to the above-described first word of the three phase fault word pattern. That is, there are bits for setting and storing a transient drop condition, the transient drop solution rate, and for setting and storing a repeated operation transient drop condition.

The second word of the transient drop word pattern is for setting and storing a preselected system generator, load, line or tie line number for the system device at which the transient drop condition is to be imposed. The third word of the transient drop word pattern is a multi-bit word for setting and storing the transient drop solution time (time from introduction of a transient drop to restoration of the dropped device to service in the power system simulator). And finally, the fourth word of the transient drop word pattern is a multi-bit word for setting and storing the transient drop restore time (time spent in restoring system initial conditions which prevailed when the transient drop was introduced).

Several other notations will be made in order to enhance the understanding of the transient contingency control flow chart of FIG. 28 as follows:

1. All of the above word pattern information is stored on disk and read into core when it is time to process the list of dynamic transient contingencies.

2. All generator swing angle restore field effect transistors (as previously described) are controlled by the same contact closure output (same word, channel, bit notation employed for a contact closure output system as set forth in copending application Ser. No. 250,826).

3. All generator restoration damping field effect transistors are controlled by the same contact closure output.

4. All generator solution rate field effect transistors are controlled by the same contact closure outputs (minimum of two contact closure outputs required for three solution rates).

5. Each module has a separate and distinct contact closure output for transient and out of service condition control (same field effect transistors for both purposes).

6. In general, any contact closure output call to the computer monitor (e.g. the P—2000 monitor described in copending application Ser. No. 250,826) must be accompanied by the associated word number (W), channel number (C) and bit number (B).

7. In keeping with (1) above, let CCO (1,1,1) control "swing angle restore; " CCO (1,1,2) control restoration damping;" and CCO (1,1,3) and CCO(1,1,4) control "switching of capacitors in or out for solution time at all generator modules."

Reference is now made to FIG. 28 which shows a flow chart for transient contingency control in a hybrid loadflow computer arrangement having transient stability analysis capability.

At the start of the transient contingency control program a decisional function is performed by a decision block 1300, which block asks whether the transient solution rate is the highest of the three preselected rates. If the answer is "yes" a block 1304 causes contact closure outputs (1,1,3) and (1,1,4) to be closed thereby causing associated field effect transistors not to conduct and omitting capacitors associated therewith from the generator modules. Then, the program transfers to a program point "D." If the answer is "no" the block 1300 feeds to a decisional block 1301 which decides whether the transient solution rate is the middle of the three preselected rates. If the answer is "yes" then a block 1306 causes contact closure output (1,1,3) to be open while contact closure output (1,1,4) is closed thereby allowing the addition of one of the two additional capacitors in the generator modules, and accordingly, a medium solution rate then, transfer to program point "D" is called. If the answer is "no" then the block 1301 feeds to a block 1302 which causes the opening of both contact closure outputs (1,1,3) and (1,1,4) and accordingly, the low solution rate. Then, program point "D" is called.

Program point "D" includes a decision block 1311 which asks whether the imposed fault for the present transient case is a three phase fault through interrogation of the three phase fault bit in the first word of the three phase fault word pattern. If the answer from decisional block 1311 is "yes," then the block 1311 feeds to block 1312 which finds the bus word, channel, and bit for the faulted bus from the bus number word of the word pattern for a three phase fault. Block 1312 then feeds to a block 1313 which finds the line word, channel and bit for the line to be cleared from the line number word of the three phase fault word pattern. Block 1313 then feeds to a program point "A."

The bus and line word, channel and bit identifications are determined from a table of addresses (not shown) the indices of which are the preselected bus and line numbers. The word channel and bit for each line and each bus are predetermined and prestored in memory, for example, on disc.

The first block 1320 of program point "A" opens the contact closure output ($W_B, C_B, B_B$) associated with the bus to be faulted. Block 1320 then feeds to a block 1321 which calls for the fault duration delay from the three phase fault word pattern for delay of further operation of the program until the delay time has expired. Block 1321 then feeds block 1322 which closes contact closure output ($W_B, C_B, B_B$) after the appropriate fault duration. This causes the associated bus to be grounded for the fault duration time of the three phase fault, that is until the associated faulted line is cleared.

Next, block 1322 feeds to a block 1323 which opens contact closure output ($W_L, C_L, B_L$) for the line to be cleared. Block 1323 then feeds to a block 1324 which causes delay for the previously described solution time minus the fault duration time as determined from the three phase fault word pattern. Block 1324 then feeds to a block 1326 which closes contact closure output ($W_L, C_L, B_L$) at the end of the solution time delay and then feeds to a program point "B," to be described hereinafter. The above accomplishes restoration of the cleared line as previously described.

Returning to decisional block 1311, if the transient case is not a three phase fault case, i.e., if it is a transient drop case, then block 1311 feeds a block 1330 which calls for the word, channel and bit of the device to be dropped from the transient drop word pattern and then feeds to a program point "C."

At "C" block 1332 opens contact closure output ($W_D, C_D, B_D$) associated with the device (generator, load, line or tie line) to be dropped. Block 1332 then feeds to a block 1333 which delays the program for the solution time determined from the transient drop word pattern. The block 1333 then feeds to a block 1334 which closes contact closure output ($W_D, C_D, B_D$). Thus, the dropped device is restored to the system. The block 1334 then feeds to the program point "B."

The program point "B" is the common part of the program for restoration of the power system simulator to initial conditions and includes a block 1340 which opens contact closure output (1,1,1) for swing angle restoration, (momentarily and preferably to zero) at the generator modules after the transient condition has occurred. The block 1340 then feeds to a block 1341 which opens contact closure output (1,1,2) for increased damping of generator modules for quickened attainment of system initial conditions. The block 1341 then feeds to a block 1342 which closes the contact closure output (1,1,1) and then feeds to a block 1343. Accordingly, generator swing angles are allowed to run free and thereby return to their initial values.

The block 1343 delays for the restore time as determined by the three phase fault or transient drop word patterns and then feeds to a block 1344 which closes contact closure output (1,1,2) removing damping from the generator modules. The block 1344 then feeds to a decisional block 1347 which asks whether a repeated operation solution is required for the previously established transient condition. If the answer is no, the solution has ended (i.e., returned to a master control scan and store function to be described hereinafter). If the answer is "yes" then block 1347 feeds to a decisional block 1348 which asks whether the previous transient condition was a three phase fault. If the answer is "yes" then program point "A" is repeated for a three phase fault. If the answer is "no" then the program point "C" is repeated for a transient drop. Repeated operation would normally be set by an operator interface and terminated after a preselected desired number of repetitions through clearing the repeated operation bit.

MASTER CONTROL FLOW CHART FOR DIGITAL CONVERGENCE OF A LOADFLOW SOLUTION, IMPOSITION OF TRANSIENT FAULTS, AND TRANSIENT STABILITY MONITORING IN A HYBRID LOADFLOW COMPUTER ARRANGEMENT HAVING TRANSIENT STABILITY ANALYSIS CAPABILITY

For an overview of digital loadflow and transient contingency control and transient stability monitoring shown in FIGS. 25A, 25B and 25C, 27 and 28, reference is now made to FIG. 29 which shows a master control flow chart for a hybrid loadflow computer arrangement having transient stability analysis capability as depicted, for example, in FIG. 10. The master control program shown in FIG. 29 is preferably bid automatically about every 15 minutes.

At the start of the master control flow chart, a block 1400 formats the basecase data, i.e., all pertinent system data for reaching a loadflow solution for all system devices (buses, generators, loads, tie lines and lines) which are in service. The block 1400 then feeds to a block 1401 which sets an indicator "IFRST" equal to zero. Block 1401 then feeds to block 1402 which sets another indicator "NCONT" equal to zero. Block 1402 then feeds to a block 1403 for calling of the loadflow convergence subroutine shown in FIGS. 25A, 25B and 25C. After loadflow convergence for the basecase solution has been achieved, the block 1403 then feeds to a block 1404 which scans the steady state solution for system overloads including line overload or bus voltage out of limits and provides an alarm readout should any exist. Reference is made to copending application Ser. No. 175,286 for a better understanding of the scan and alarm functions referred to above.

Next, block 1404 feeds to a decision block 1407 which asks whether indicator IFRST is equal to one (1). If the answer is "no" then block 1407 feeds to a block 1408 for operation of a "CONTGEN" program which in conjunction with a "CONTLOGIC" program computes sets of contingency data cases for the modeled power system with preselected devices out of service as determined by the "CONTGEN" and "CONTLOGIC" programs set forth in copending application Ser. No. 175,286. The block 1408 then feeds to a block 1409. The block 1409 fetches the first set of contingency data and feeds to a block 1410 which sets the indicator IFRST equal to one (1). The block 1410 then feeds to a block 1413 which calls the loadflow convergence subroutine of FIGS. 25A, 25B and 25C for the first set of contingency data and then feeds to a block 1414 which increases the indicator NCONT by one (1) and feeds to block 1404 which repeats its scan and alarm function for the first set of contingency data.

Block 1404 then feeds decisional block 1407 again which re-asks whether indicator IFRST is equal to one. At this time the answer will be "yes" and block 1407 feeds to a decisional block 1420 which asks whether indicator NCONT is equal to NMAXSS, in accordance with a preselected maximum number of contingency cases. If the answer is "no" then block 1420 feeds a block 1421 which fetches the next set of contingency data to be converged to a loadflow solution. This is repeated for all contingency data cases until NCONT = NMAXSS at which time the block 1420 feeds to a block 1430.

The block 1430 is the first block in the dynamic portion of the master control flow chart of FIG. 29 and resets the indicator NCONT equal to zero, as well as setting a scan indicator NSCAN (NS in FIG. 26) equal to zero. The block 1430 then feeds a block 1431 which fetches the first set of dynamic contingency data (three phase fault or transient drop word patterns) and feeds to a block 1432. The block 1432 increases indicator NCONT by one (1) and feeds to block 1433 which calls the transient contingency control subroutine of FIG. 28.

After a transient condition has been imposed, the block 1433 feeds to block 1434 which scans and stores all generator swing angles ($\delta$) and rotational velocities ($\omega$) and then feeds to a block 1437. The block 1437 increases the scan indicator NSCAN by one (1) and feeds to a time delay block 1438 which has a typical real time delay of about 0.1 sec. for a real time solution rate, to allow for sampling and storing of generator swing angles and rotational velocity solutions periodically through the solution time. It will be appreciated that at increased rates, for example, 10 times faster than real time, the delay time would be decreased accordingly.

The time delay block 1438 next feeds to a decisional block 1439 which asks whether NSCAN = NSCAN-MAX, a preselected maximum number of scans. If the answer is "no" then block 1439 feeds to block 1434 through block 1438 until the maximum number of scans has been reached and then block 1439 feeds to a block 1441. The block 1441 then calls the transient stability monitoring subroutine of FIG. 26.

After transient stability monitoring, the block 1441 feeds to a decisional block 1442 which asks whether the indicator NCONT = NMAXDY, a maximum number of imposed transient conditions. If the answer is "yes" the master control program is ended. If, however, the answer is "no" the block 1442 feeds a block 1443 which fetches the next dynamic contingency data set and feeds to a block 1444 which sets NSCAN equal to zero and feeds to block 1432 for repetition of transient contingency control, scanning and transient stability monitoring functions until NCONT = NMAXDY.

APPENDIX B

FUNCTIONAL DESCRIPTION OF DATA LINK EMPLOYED FOR TRANSMISSION OF ON-LINE POWER SYSTEM VALUES AND STATUS

An on-line dispatch and control computer acquires (through a data acquisition system) voltage magnitude values, the power flow values, load power values and unit generator megawatt values. In addition it acquires the out-of-service status of system equipment. Unit megawatts and the powers are acquired typically every 2 seconds, voltage magnitudes typically every minute.

Periodically these raw data values are transmitted serially from dispatch and control to the preferably employed P—2000 computer. Upon receipt of data from the data link the P—2000 computer stores each datum in its appropriate and predetermined location on a P—2000 disk. Thus the most up-to-date data are disk resident when the basecase bid is made.

When a basecase bid occurs, raw data is read into core from the P—2000 disk and data is compressed and formatted in preparation for the loadflow convergence program (C.F. the DATSET program in copending application Ser. No. 175,286.

We claim:

1. A DC analog simulator for AC power networks cpmprising a plurality of bus DC circuits, generator DC circuits, load DC circuits and line DC circuits, said bus DC circuits including first and second circuits for generating respective output voltage phasor signals corresponding to first and second coordinate components of the voltages at the respective buses, said generator DC circuits including third and fourth circuits for generating respective output current phasor signals corresponding to first and second coordinate components of generation currents for the actual generators, said load DC circuits including fifth and sixth circuits for generating respective output current phasor signals corresponding to first and second coordinate components of bus to load currents for the actual loads, said line DC circuits including seventh and eighth circuits for generating respective output current phasor signals corresponding to first and second coordinate components of at least the equivalent series branch currents for the actual lines, and means for interconnecting the bus, generator, load and line DC circuits in a manner corresponding to bus, generator, load and line interconnections in the AC network.

2. A DC analog simulator as set forth in claim 1 wherein said first and second, third and fourth, fifth and sixth and seventh and eighth circuits operate with output signals respectively representative of real and imaginary quantities.

3. A DC analog simulator as set forth in claim 1 wherein said bus, generator, load and line DC circuits comprise modular DC circuits.

4. A DC analog loadflow calculator for simulation of an AC network, said calculator including a plurality of bus DC circuits, generator DC circuits, load DC circuits, and line DC circuits interconnected to correspond to the AC network, said generator DC circuits including means for receiving generator power and voltage magnitude actual and constraint input signals, said load DC circuits including means for receiving load power actual and constraint input signals, each of said bus DC circuits including means for responding to generator, load, and line phasor input current signals and for generating an output bus voltage phasor signal, each of said generator DC circuits including means for responding to the difference between said actual and constraint generator power input signals and means for responding to the difference between said actual and constraint generator voltage magnitude input signals, and for generating an output generator current phasor signal, each of said load DC circuits including means for responding to the difference between said actual and constraint load power power signals and for generating an output load current phasor signal, each of said line DC circuits including means for responding to the difference between applied bus voltage phasor signals and generating an output line phasor current signal in accordance with at least a representation of the equivalent series branch impedance.

5. A DC loadflow calculator as set forth in claim 4 wherein said means for receiving actual and constraint generator signals, said means for receiving said actual and constraint load power signals, means for responding to generator, load and line phasor current signals, and means for responding to the difference between applied bus phasor voltages comprise amplifiers.

6. A DC loadflow calculator as set forth in claim 4 wherein said bus, generator, load and line DC circuits comprise modular DC circuits.

* * * * *